(12) United States Patent
Hibi

(10) Patent No.: US 6,208,117 B1
(45) Date of Patent: Mar. 27, 2001

(54) BATTERY PACK AND ELECTRONIC APPARATUS USING THE SAME

(75) Inventor: Michio Hibi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/536,997

(22) Filed: Mar. 29, 2000

(30) Foreign Application Priority Data

Jul. 30, 1999 (JP) .................................................. 11-216552

(51) Int. Cl.[7] .................................................. H01M 10/46
(52) U.S. Cl. .......................................... 320/134; 320/136
(58) Field of Search .................................. 320/118, 119, 320/132, 134, 136

(56) References Cited

U.S. PATENT DOCUMENTS 5,526,215 * 6/1996 Higashijima et al. .
5,547,775 * 8/1996 Eguchi et al. .
5,708,351 * 1/1998 Takamoro .
5,896,025 * 4/1999 Yamaguchi et al. .

* cited by examiner

Primary Examiner—Edward H. Tso
(74) Attorney, Agent, or Firm—Armstrong, Westerman, Hattori, McLeland & Naughton

(57) ABSTRACT

When a power supply activating signal is inputted from an input terminal by depressing a main power supply switch of an electronic apparatus, electric power is supplied from a battery to a protection circuit portion and a management circuit portion through a pack power supply control circuit. Thus, the self discharge of the battery is reduced when a battery pack is not used. The protection circuit portion is operative to output a detection signal to the management circuit portion. Further, the management circuit portion posts a state of the battery to the electronic apparatus. The protection circuit portion is not controlled by the management circuit portion. Thus, even when a bug or a runaway occurs in MCU circuit of the management circuit portion, the battery can be safely protected.

23 Claims, 37 Drawing Sheets

Fig.6A

T1: MONITOR OUTPUT OF PACK VOLTAGE
T2: MONITOR OUTPUT OF VOLTAGE OF CELL-1
T3: MONITOR OUTPUT OF VOLTAGE OF CELL-2
T4: MONITOR OUTPUT OF VOLTAGE OF CELL-3
T5: MONITOR OUTPUT OF VOLTAGE OF CELL-4

T6: CALIBRATION OUTPUT OF PACK VOLTAGE MONITORING CIRCUIT
T7: CALIBRATION OUTPUT OF CELL-1 VOLTAGE MONITORING CIRCUIT
T8: CALIBRATION OUTPUT OF CELL-2 VOLTAGE MONITORING CIRCUIT
T9: CALIBRATION OUTPUT OF CELL-3 VOLTAGE MONITORING CIRCUIT
T10: CALIBRATION OUTPUT OF CELL-4 VOLTAGE MONITORING CIRCUIT

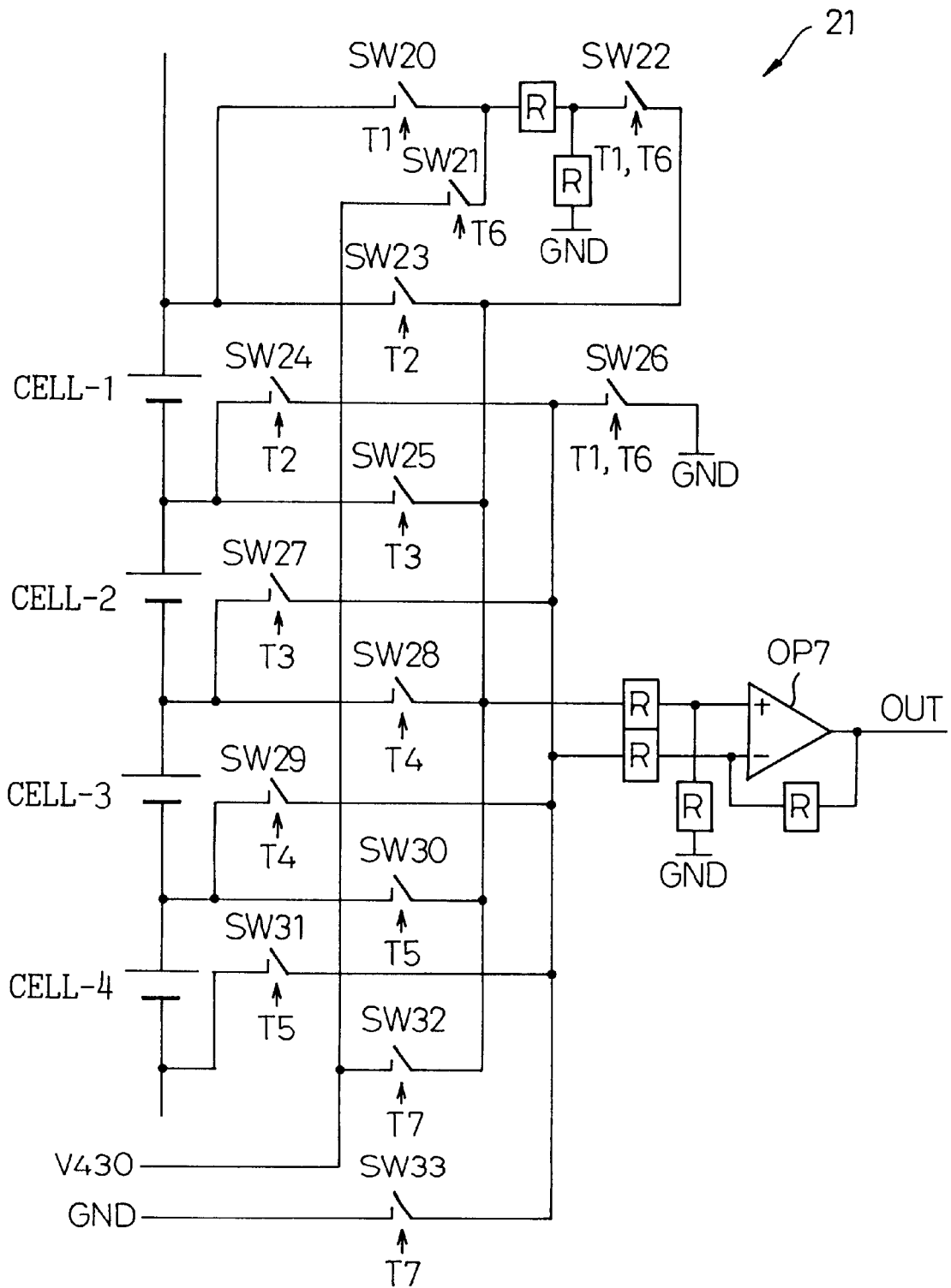

Fig.8A

T1: MONITOR OUTPUT OF PACK VOLTAGE
T2: MONITOR OUTPUT OF VOLTAGE OF CELL-1
T3: MONITOR OUTPUT OF VOLTAGE OF CELL-2
T4: MONITOR OUTPUT OF VOLTAGE OF CELL-3
T5: MONITOR OUTPUT OF VOLTAGE OF CELL-4

T6: CALIBRATION OUTPUT OF PACK VOLTAGE MONITORING CIRCUIT
T7: CALIBRATION OUTPUT OF CELL VOLTAGE MONITORING CIRCUIT

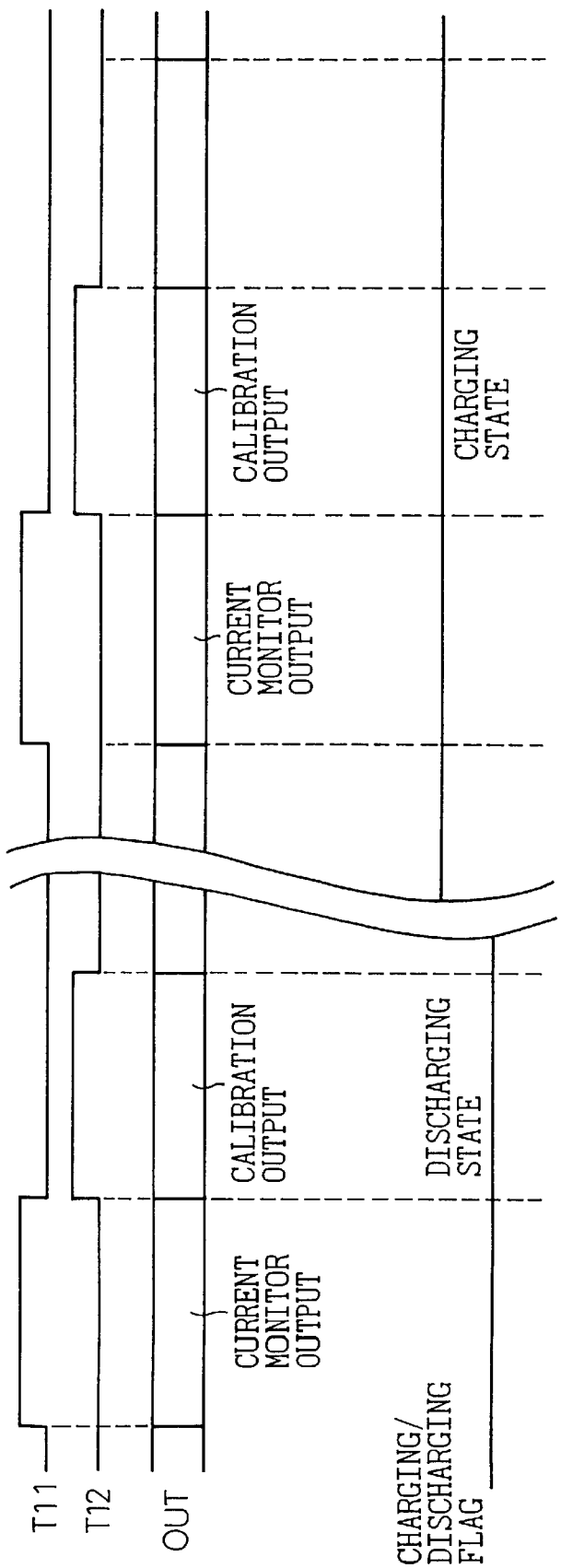

Fig.23A

| CHARGING/DISCHARGING FLAG | CONTROL INPUT SIGNAL | | | | | | |
|---|---|---|---|---|---|---|---|
| | OVERCHARGE-1 | OVERCHARGE-2 | OVERCHARGE CURRENT | OVER-DISCHARGE-1 | OVER-DISCHARGE-1 | OUTPUT SHORT-CIRCUIT | OVER-DISCHARGE CURRENT *2 |
| DURING CHARGE | DETECTED | X | X | X | X | X | X |
| DURING CHARGE | X | X | DETECTED | X | X | X | X |
| X | X | DETECTED | X | X | X | X | X |
| DURING DISCHARGE | X | X | X | DETECTED | X | X | X |
| DURING DISCHARGE | X | X | X | X | X | DETECTED | X |
| DURING DISCHARGE | X | X | X | X | X | X | DETECTED |

Fig.23B

| PROTECTION OPERATION ACCORDING TO CONTROL OUTPUTS | | |
|---|---|---|
| INHI_CHG_1 | INHI_CHG_2 | INHI_DISCHG |
| CHARGE INHIBITION | — | — |
| CHARGE INHIBITION | — | — |
| — | CHARGE INHIBITION | — |
| — | — | DISCHARGE INHIBITION |
| — | — | DISCHARGE INHIBITION |
| — | — | DISCHARGE INHIBITION |

*2

BATTERY PACK AND ELECTRONIC APPARATUS USING THE SAME

BACKGROUND OF THE INVENTION

1. Field of the Invention

The present invention relates to a battery pack having a battery protection monitoring circuit and to an electronic apparatus using such a battery pack.

2. Description of the Related Art

A conventional battery pack having a battery protection monitoring circuit, and an electronic apparatus using such a battery pack will be described by referring to FIG. 1. In this figure, a conventional battery pack 100 is detachably attached to a main unit 200, such as a portable information terminal, and supplies electric power to the main unit 200.

The conventional battery pack 100 has a chargeable and dischargeable battery 300, a protection circuit 400 for protecting the battery 300, and a management circuit portion 500 for posting a state of the battery 300 to a main unit 200 by using firmware.

The protection circuit portion 400 has an overcurrent detecting circuit 130 for detecting an overcurrent, an overcharge detecting circuit 150 for detecting overcharge of the battery 300, an overcurrent/overcharge protection circuit 140 for protecting the battery 300 from overcurrent and overcharge conditions, and a temperature detecting circuit 160 for detecting a temperature in the battery pack 100. The management circuit portion 500 has a microcontroller unit (MCU) circuit 180 for controlling each of the detecting circuit and the protection circuit and for posting the state of each of such circuits to the main unit 200.

A system power supply control portion 600 of the main unit 200 is operative to supply electric power POW fed from the battery pack 100 to the system of the main unit and to post the power state of the battery pack 100 to the system.

Protection devices of the conventional battery pack 100 illustrated in FIG. 1 are connected to the battery 300 and always continue to perform necessary minimum operations. Thus, the conventional battery pack 100 consumes electric power as part of self discharge thereof, though an amount of power consumption is low. Moreover, even when the battery pack 100 mounted in the main unit 200 is not used, the protection circuit portion 400 and the management circuit 500 of the battery pack 100 continue to perform so as to clearly indicate the presence of the battery pack 100 and the possibility of use thereof.

Therefore, when a battery pack is singly distributed, and displayed in a shopwindow, and is in stock or storage, the battery pack is gradually discharged and finally becomes dead. Further, even when a main switch of a main unit is turned off, a battery still may become exhausted. It is necessary in order to avoid the occurrence of such a situation to reduce the amount of the self-discharge of an unused battery as much as possible.

When the terminal voltage of a battery pack is almost 0, it cannot be expected that the protection circuit portion 400 and the management circuit portion 500 of the battery operate normally. Even in the case of such a battery pack, it is necessary that the battery pack can be safely charged by determining the state thereof. That is, it is necessary to easily discriminate battery packs, which cannot be used or are dangerous even when recharged, from normal battery packs, which can be used by being recharged, among battery packs that have lowered terminal voltages, and whose histories are unknown. Further, in the case that the terminal voltage of the battery 300 is almost 0 V and that the battery 300 is in an overdischarged state, it cannot be expected that the protection circuit portion 400 and the management circuit portion 500 operate normally. Thus, the battery 300 is thereafter charged under the control of the system power supply control portion 600 until the management circuit portion 500 starts to operate normally. That is, the battery 300 is charged without the protection function of the battery pack 100. Therefore, the system power supply control portion 600 needs to have the function of measuring a charging current and a pack voltage. However, the accuracy in measuring the charging current and the pack voltage in the main unit is poor owing to the fact that the ground floats relative to the battery voltage. Moreover, such a measuring function overlaps with the function of the circuit in the battery pack 100. This results in an increase in the cost of the battery pack.

There is further a danger of smoke emission and fire occurrence, resulting from a failure, owing to the fact that the battery 300 stores a large amount of energy. Thus, a safety mechanism is employed. For example, an internal-pressure-rise relief valve for relieving an internal pressure rise due to a circuit opening, which is caused by an overcurrent, and extraordinary temperature rise is provided in a battery cell itself. The battery pack 100 has an output short-circuit protection function and an overcharge protection function. The system power supply control portion 600 has an abnormal charging control protection function and a temperature anomaly protection function.

Various detecting circuits, such as the overcurrent detecting circuit 130 and the overcharge detecting circuit 150, are provided in the protection circuit portion 400. These circuits perform detection operations by using comparators. The overcharge detecting circuit 150 of the conventional protection circuit portion 400 has a single threshold value for detecting an overcharge. Moreover, the overcurrent detecting circuit 130 thereof employs a single threshold value for detecting an overcurrent.

In the case that the threshold for detecting an overcharge has a single value, even when an overcharge is normally detected, the charging of the battery is continued if no protection (or control) means operate normally according to a result of the detection of an overcharge. Thus, the charging of the battery proceeds, so that in a worst case, there is a danger of emission and fire. Mechanical measures, such as an internal pressure relief valve, may be taken in each of the battery cells. It is, however, important for protecting a battery, which is adapted to store large energy, to improve the reliability thereof by doubling the protection means. In this case, the dual protection realized by employing different protection means is more effective in improving the safety of the system than that realized by employing the same protection circuits. In the case that the conventional battery pack is adapted to have two systems having protection functions, it is necessary to prevent both systems from mutually interfering with each other to thereby impede normal operation of the battery pack.

Further, in the case that the threshold for detecting an overdischarge has a single value, even when an overdischarge is normally detected, the discharging of the battery is continued if no protection (or control) means operate normally according to a result of the detection of an overcharge. Thus, the discharging of the battery proceeds, so that in a worst case, an irreversible reaction may proceed in the battery so that the battery cannot be recharged. Further, when the battery pack enters a discharge region, a drop in the terminal voltage increases with the use of energy. This may suddenly impede an operation of the system. It is, thus, important for ensuring a stable operation of the system to improve the reliability thereof by doubling the protection means. In the case of protecting the battery from an overdischarge, similarly to the case of protecting the battery from a overcharge, the dual protection realized by employing different protection means is more effective in improving the safety of the system than that realized by employing the same protection circuits. In the case that the conventional battery pack is adapted to have two systems having the protection functions, it is necessary to prevent both systems from mutually interfering with each other to thereby impede normal operation of the battery pack.

In the conventional battery pack 100 illustrated in FIG. 1, the protection circuit portion 400 and the management circuit portion 500 can be constituted by one or more LSIs. Further, the protection circuit portion 400 and the management circuit portion 500 may be constituted by different LSIs, respectively. In this case, monitor data represented by an analog signal sent from each of the detecting circuits is received at an analog-to-digital conversion (ADC) input portion having an A/D conversion function in the MCU circuit 180. Status information represented by a digital signal is received at an input/output (I/O) port thereof. Thus, various kinds of monitor data and status information are outputted from the protection circuit portion 400 to the management circuit portion 500. This is a primary factor of an increase in the number of input/output pins of each of the LSIs.

An erroneous detection may occur in each of the various kinds of detecting circuits of the protection circuit portion 400 owing to an abrupt change in load, a transition current at the time of attachment of each of the detecting circuits to the main unit 200 or detachment of each of the detecting circuits therefrom, and impulse noises thereto. Even when a method of limiting a band width of detected signals by connecting a resistor R and a capacitor C thereto to thereby constitute a low-pass filter (LPF) is performed as a countermeasure to an error detected in this way, this method has drawbacks in that the value of CR increases because the frequencies of a necessary region are too low, that, the detecting circuits thus cannot be incorporated into an LSI, and that, when the capacitor is externally installed, the number of pins of the LSI increases. Further, although there is need for sending status and monitor data detected by the protection circuit portion 400 to the MCU circuit of the management circuit portion 500, it is desired to enable the sending of multiple status and monitor data to the MCU circuit without increasing the number of pins of the LSI and the size of the control circuit.

A method of detecting a rise in the temperature of the battery 300 due to an overcharge and of stopping the charging thereof is used so as to protect the battery from an overcharge. This method, however, has drawbacks in that the accuracy thereof is poor and that the response time is long. Moreover, a method of detecting a change in a battery voltage, which is caused by an overcharge, a rate of such a change, a variation in electric current, and a change in the internal impedance, is also used. This method, however, has drawbacks in the poor accuracy thereof and in the complex constitution of the circuit.

A method of detecting a decrease in the voltage of each of the cells of the battery 300, which is caused by an overdischarge, and of stopping the discharging thereof has been used so as to protect the battery from overdischarge. This method is adapted to detect that among a plurality of cells, the cell voltage of one of the cells is lower than a predetermined threshold value. Thus, even if the battery pack 100 still has available electric power, when the discharge occurred in a part of the cells is detected, the entire battery pack 100 is regarded as being overdischarged. Therefore, this method has a drawback in that the available electric power of the battery pack 100 cannot be fully used. In contrast, generally, a method of monitoring the overdischarge voltage of the entire battery 300 instead of monitoring the overdischarge voltage of each of the cells uses the monitoring means in common at the time of charging the battery 100 and at the time of discharging thereof. Consequently, it is inevitable for avoiding the danger at the time of overcharging a lithium battery to monitor each of the cells. Thus, this method cannot be employed.

Even if the battery pack 100 is constituted by selecting battery cells so that the terminal voltages of the battery cells, all of which are new articles, are equal to one another, a difference is caused in terminal voltage among the cells owing to a large difference in charging/discharging deterioration characteristics among the individual cells when the use of the battery 100 is continued. This results in occurrence of a drawback in that the available power of the battery pack 100 cannot be fully used.

Usually, the threshold for detecting an overdischarge is set at a rather high value so as to ensure a stable operation of the system during the discharging of the battery. In this case, some battery packs 100 may be detected as being overdischarged, even when such battery packs still have sufficient available capacity.

Further, there has been developed a method of monitoring the voltage and current of the battery 300 and managing the remaining capacity so as to ensure a stable operation of the system when overdischarged. As shown in FIG. 1, this method uses the MCU circuit 180. Thus, there is a possibility that bugs may occur in the firmware (or software) and that a runaway of the MCU 180 may occur. Consequently, this method has a drawback in that it is difficult to ensure reliable protection.

In the case that an overcurrent, whose magnitude is outside a normal operation range, flows in the battery pack 100, there is a necessity for surely protecting the battery pack 100 without damaging the circuit and parts thereof. A method of detecting a current flowing through the battery 300 and turning off a switch, which is usually constituted by a field effect transistor (FET) and provided on a charging/discharging path, in the case in which the detected value of the current exceeds a predetermined value, is employed so as to protect the battery pack 100 against an overcurrent. There is another method of protecting the battery pack 100 by causing a fuse to be blown by an overcurrent. However, after such an operation, the blown fuse must be replaced with new one. Thus, it is desired that the battery pack 100 have the function of protecting the battery 300 before the fuse blows.

Moreover, there is the need for allowing the protection function to be performed without being affected even at an occurrence of a malfunction of the managing/monitoring function of the management circuit portion 5000 of the battery pack 100 to thereby ensure the safety thereof. For example, when the value of a comparison voltage set in the overcurrent detecting circuit 130 or the overcharge detecting circuit 150 becomes abnormal owing to bugs occurring in the firmware of the MCU circuit 180, the detection cannot be correctly achieved. An occurrence of such a situation should be prevented. Furthermore, there is the need for preventing an occurrence of a situation, in which the charging or discharging of the battery cannot be achieved due to bugs occurring in the firmware of the MCU circuit 180 even if the protection circuit portion 400 operates normally.

Additionally, it is necessary to accurately detect which of a charging direction and a discharging direction the direction of a flow of a pack current is. Especially, in the case of a low current, for instance, in the case that the main unit 200 is in a standby state or a sleep state, for the purpose of precisely discriminating between a charging state and a discharging state, it is necessary to accurately detect which of the charging direction and the discharging direction the direction of a flow of a pack current is.

SUMMARY OF THE INVENTION

Accordingly, an object of the present invention is to provide a high-safety battery pack at low cost, and to provide an electronic apparatus, such as a portable information terminal, using such a battery pack.

Another object of the present invention is to reduce an amount of self-consumption of power of a battery pack.

Another object of the present invention is to provide a battery pack, which can be distinguished as a defective one or as a non-defective one, so as to enable the reuse of an overdischarged battery pack.

Another object of the present invention is to provide a battery pack, which can perform a battery protection function without an erroneous detection of an overcurrent and an overcharge and without being affected even when a runaway of the MCU circuit thereof occurs.

Another object of the present invention is to provide a battery pack, which can reduce the number of pins of an LSI package constituting battery pack protection circuits.

A battery pack of the present invention has an input terminal, into which a power supply activating signal is inputted from the exterior. When a power supply activating signal is inputted to this input terminal, a battery is connected to a protection monitoring circuit as a power supply therefor. Conversely, when no power supply activating signal is inputted to the input terminal, the power supply for the protection monitoring circuit is shut off. Consequently, the amount of the self-discharge (including operation power of the protection circuit portion and the management circuit portion) of an unused battery can be reduced.

A battery pack of the present invention may have a power supply output terminal, which is connected to the battery, for applying a voltage signal from the battery to the input terminal through an external switch. Thus, a power supply system of the apparatus can apply a voltage represented by the power supply activating signal to the input terminal from the power supply output terminal even when no electric power is provided from an AC adapter or another battery.

In the case of a battery pack of the present invention, the electric power of the power supply activating signal can be used as the electric power supplied into a power supply by connecting the input terminal, into which the power supply activating signal is inputted, to the power supply for precharge control by the protection monitoring circuit. Thus, even in the case of a battery pack whose terminal voltage is almost 0, the protection circuit portion and the management circuit portion are operated normally by the electric power supplied from the input terminal into which the power supply activating signal is inputted. Consequently, protection can be accurately achieved whether or not the battery is defective.

The protection monitoring circuit of the battery pack of the present invention comprises a protection circuit portion and a management circuit portion. The protection circuit portion has a detecting circuit for detecting an overcurrent and/or an overcharge/overdischarge, and a circuit for protecting the battery from the overcurrent and/or the overcharge/overdischarge. The management circuit portion receives a signal from the protection circuit portion and posts the state of the battery to the exterior by using firmware. The protection circuit portion is constructed as a circuit that is not controlled by the management circuit portion. Therefore, even when bugs occur in the firmware for the management circuit portion, the battery can be safely protected from an over current, an overcharge, and an overdischarge.

The detecting circuit of the protection circuit portion may comprise a circuit which has a dead time and is adapted to determine that a certain detection state is detected, if a certain detection state continues for a predetermined duration, and to then output a detection signal. This detection dead time is established in such a manner as to be able to set the frequency or the count of sampling clocks, and to correspond to predetermined different durations. Consequently, an erroneous detection can be prevented from occurring owing to an impulse-like change, such as a noise.

The protection monitoring circuit of the battery pack of the present invention has a signal line for transmitting status and monitor data from the protection circuit portion to the management circuit portion. Each of signals outputted from the protection circuit portion to the management circuit portion is allotted to a predetermined time slot. Further, such signals are outputted in a time division multiplex manner onto the same signal line through a predetermined sequence. Consequently, when the protection circuit portion and the management circuit portion are constituted by LSIs, the number of input/output pins of the LSIs can be decreased. The protection monitoring circuit of the present invention may have a signal line, through which a sequence start signal for definitely determining a leading end of the sequence is outputted, in addition to the signal line for transmitting status data and monitor data from the protection circuit portion to the management circuit portion. Thus, the management circuit portion can receive the status data and the monitor data only at two pins. This signal line for transmitting status data and monitor data is connected to both of a digital signal input port and an analog signal input port. Consequently, both of a digital signal and an analog signal can be sent from the protection circuit portion to the management portion through the same signal line.

The protection circuit portion of the battery pack of the present invention may have a first overcharge detecting portion, which uses a first overcharge detecting threshold value, and a second overcharge detecting portion using a second overcharge detecting threshold value. The protection circuit portion is constructed so that the second overcharge detecting portion is enabled when this first overcharge detecting portion detects said threshold value. Alternatively, the first overcharge detecting portion and the second overcharge detecting portion are constituted in such a way as to detect an overcharge independent of each other. Consequently, an overcharge can be detected with reliability. For example, the protection circuit portion may have a charging/discharging inhibition control portion adapted to turn off a switch provided on the charging path to thereby forcefully stop the charging of the battery when the first overcharge detecting portion detects an overcharge, and adapted to forcefully stop the charging by a fuse provided on the charging path, when the second overcharge detecting portion detects an overcharge. Consequently, the charging of the battery is safely inhibited when an overcharge is detected.

The protection circuit portion of the battery pack of the present invention may have a first overdischarge detecting portion, which uses a first overdischarge detecting threshold value, and a second overdischarge detecting portion using a second overdischarge detecting threshold value. The protection circuit portion is constructed so that the second overdischarge detecting portion is enabled when this first overdischarge detecting portion detects said threashold value. Alternatively, the first overdischarge detecting portion and the second overdischarge detecting portion are constituted in such a way as to detect an overdischarge independent of each other. Further, the first or second overdischarge detecting portion is constructed so that an overdischarge is detected by comparing the voltage of the battery pack with a predetermined voltage. Consequently, an overdischarge detecting can be securely achieved. For instance, the protection circuit portion may have a charging/discharging inhibition control portion adapted to warn of an overdischarge by outputting a signal representing an overdischarged state to the management circuit portion, when the first overdischarge detecting portion detects an overdischarge, and adapted to turn off a switch provided on a discharging path to thereby forcefully stop the discharging, when second overdischarge detecting portion detects an overdischarge. Consequently, a control operation for inhibiting an overdischarge can be achieve.

The protection circuit portion of the battery pack of the present invention is adapted so that when the switch provided on the discharging path is turned off in response to a detection of an overcharge, the power supply for the protection monitoring circuit is turned off or an operation of the protection monitoring circuit is disabled. Consequently, the power consumption after the detection of an overdischarge can be reduced.

The protection circuit portion of the battery pack of the present invention may have a first overcurrent detecting portion, which is operative to detect an output short-circuit by using a first overcurrent detecting threshold value, and a second overcurrent detecting portion, which is operative to detect an overcurrent by using a second overcurrent threshold value. The dead time set in one of the overcurrent detecting portions, which has the threshold value larger than that of the other overcurrent detecting portion, is reduced. Conversely, the dead time set in the latter overcurrent detecting portion, which has the threshold value smaller than that of the other overcurrent detecting portion, is lengthened. Furthermore, the first overcurrent detecting portion and the second overcurrent detecting portion are constructed in such a way as to detect an overcurrent completely independent of each other. Consequently, an overcurrent can be detected with reliability.

The protection circuit portion of the battery pack of the present invention may have an overcurrent monitoring portion adapted to detect which of a charging direction and a discharging direction a direction of flow of a pack current is, and to detect the magnitude of a monitor output voltage as a value proportional to the absolute value of the pack current, regardless of the direction of the pack current. Consequently, the pack current can be accurately detected even when the main unit is in the standby state or the sleep state.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 6A, 6B, and 6C are diagrams illustrating an operation of the circuit of FIG. 5;

FIG. 7 is a circuit diagram illustrating the constitution of a second example of the cells and the pack voltage monitoring circuit;

FIGS. 8A, 8B, and 8C are diagrams illustrating an operation of the circuit of FIG. 7;

FIG. 10 is a timing chart illustrating output timing of the pack current monitoring circuit;

FIGS. 23A and 23B are tables illustrating conditions for control outputs of the charging/discharging inhibition control circuit;

DETAILED DESCRIPTION OF THE PREFERRED EMBODIMENTS

Figure 1:
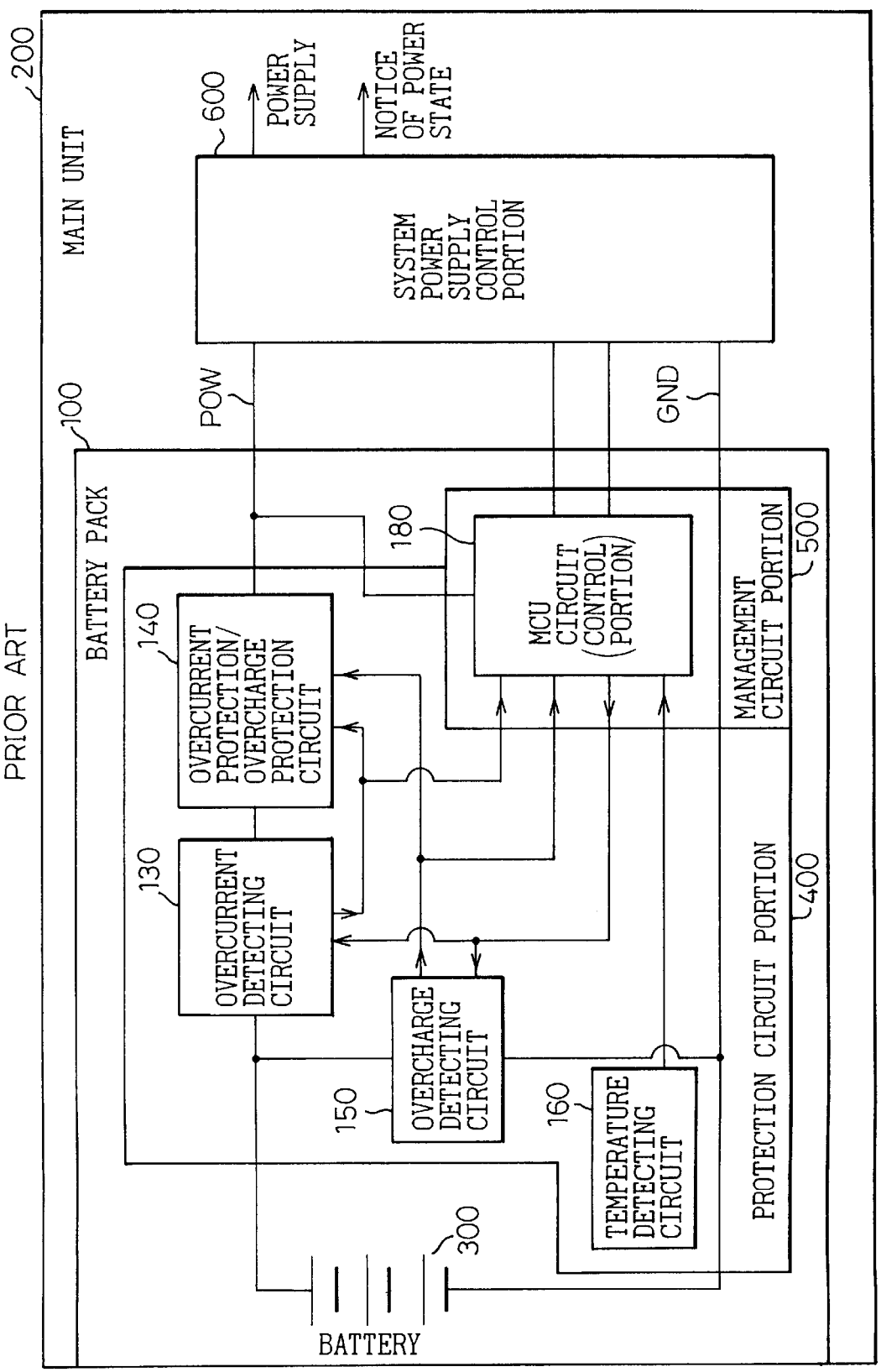
FIG. 1 is a circuit diagram illustrating the constitution of a conventional battery pack.
Figure 2:
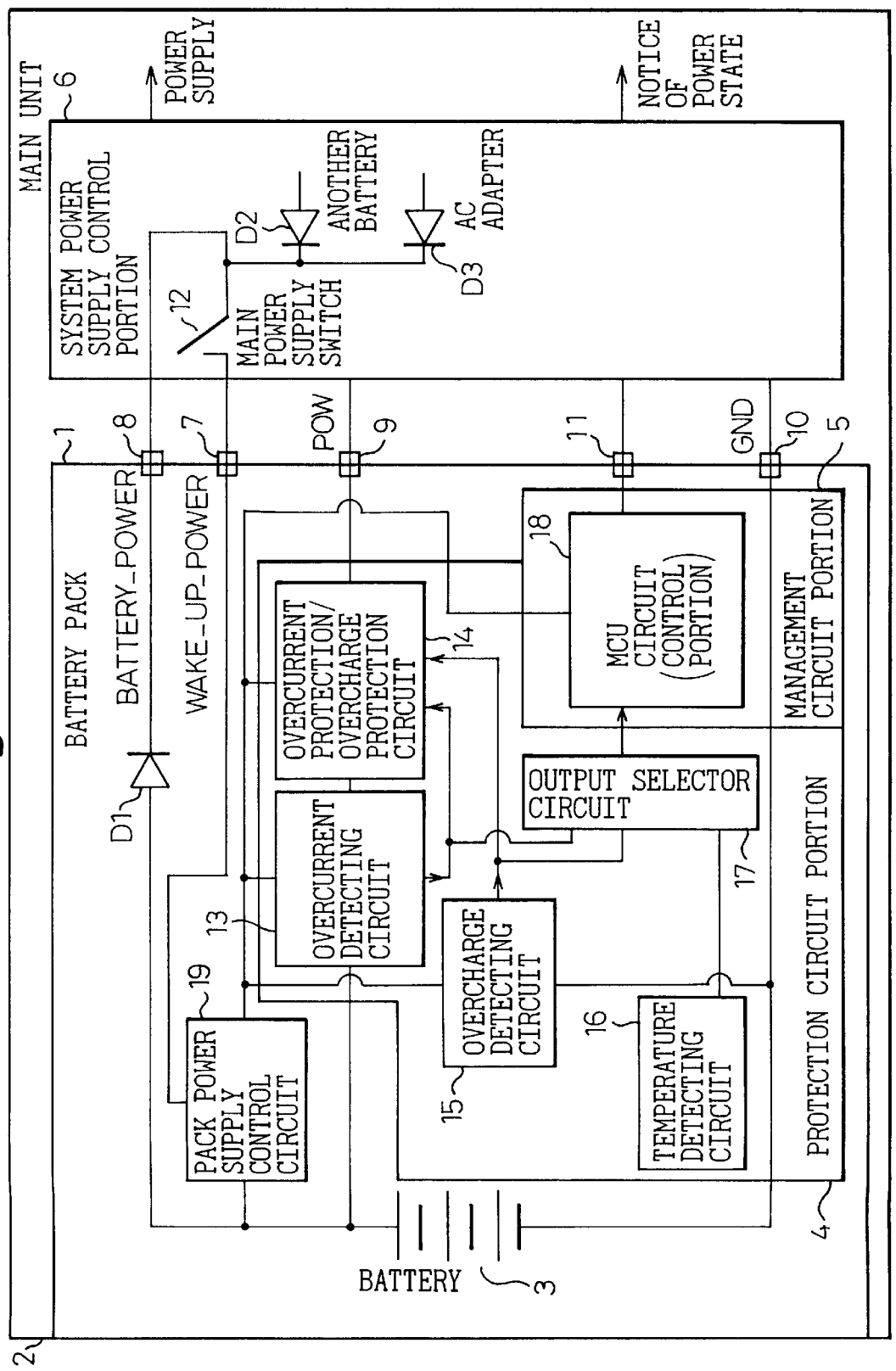
FIG. 2 is a circuit diagram illustrating a state of a battery pack of the present invention, which is attached to an electronic apparatus.
Figure 3:
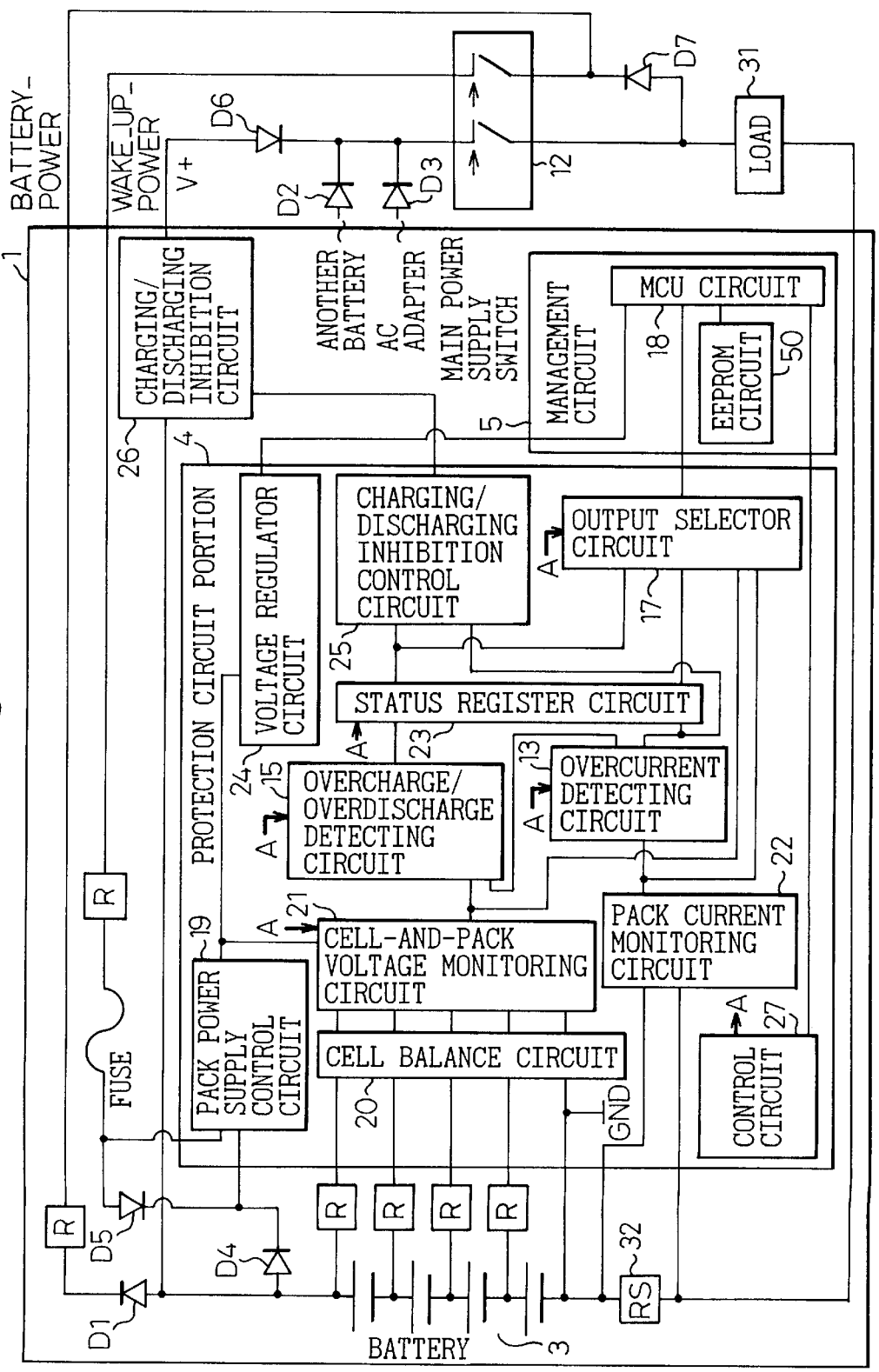
FIG. 3 is a circuit diagram more concretely illustrating the circuit of the battery pack of FIG. 2.

FIG. 2 is a circuit diagram illustrating a state of a battery pack attached to an electronic apparatus. FIG. 3 is a circuit diagram more concretely illustrating the circuit of this battery pack.

As shown in FIG. 2, a battery pack 1 is detachably attached to a main unit 2. The battery pack 1 consists of a chargeable and dischargeable battery 3, a protection circuit portion 4 for protecting the battery 3, and a management circuit portion 5 formed by firmware for posting a state of the battery 3 to the main unit 2. Further, the battery pack 1 supplies electric power to the main unit 2.

The protection circuit portion 4 has an overcurrent detecting circuit 13 for detecting an overcurrent, an overcharge/overdischarge detecting circuit 15, an overcurrent protection/overcharge protection circuit 14 for protecting the battery 3 from an overcurrent and an overcharge, a temperature detecting circuit 16 for detecting a temperature of the battery pack 1, and an output selector circuit 17 for outputting status data and monitor data in a time division multiplexing manner. The management circuit portion 5 has an MCU circuit 18 for posting a state of the battery pack 3 to the main unit 2 by using the firmware according to information detected by the protection circuit portion 4.

A system power supply control portion 6 of the main unit 2 is supplied with electric power from a charging/discharging terminal (POW) and a ground terminal (GND) 10 of the battery pack 1. Further, the system power supply control portion 6 feeds electric power to the system in the main unit 2. Furthermore, the system power supply control portion 6 is sometimes supplied with electric power from another battery or an AC adapter. Moreover, the system power supply control portion 6 posts the power state of the battery pack 1 to the system according to information received from the battery pack 1. Reference numeral 12 designates a main power supply switch of the main unit 2.

As shown in FIG. 3, the protection circuit 4 has the following circuits, that is, a cell balance circuit 30 for charging each of cells of the battery 3 in a well-balanced manner, a cell-and-pack voltage monitoring circuit 21 for monitoring the voltage of each of the cells provided in the battery 3 and of the entire battery 3, a pack current monitoring circuit 22 for monitoring a pack current, a status register circuit 23 for holding status information of the battery pack 1, a voltage regulator circuit 24 for generating a voltage that is necessary for each of the circuits, a charging/discharging inhibition control circuit 25 corresponding to the overcurrent protection/overcharge protection circuit 14, a charging/discharging inhibition circuit 26 constituted by a switch and a fuse, which are provided on the charging/discharging path, a monitoring timing control circuit 27 for generating an operation timing signal and a clock signal for the circuits, and a current detecting resistor (RS) 32. The main unit 2 includes a load 31 that consumes electric power of the battery pack 1. The management circuit portion 5 has the MCU circuit 18, and an EEPROM circuit 50 for storing a microprogram to be used for operating the MCU circuit 18. The function of each of the circuits will be described later.

As shown in FIG. 2, input/output terminals of the battery pack 1 are an input terminal (hereunder referred to as a "WAKE_UP_POWER terminal") 7 for inputting the power supply activating signal, a power supply output terminal (hereunder referred to as a "BATTERY_POWER terminal") 8 connected to the battery 3, a charging/discharging terminal 9 for supplying electric power to the main unit 2 and obtaining electric power from a battery charger (not shown), a ground terminal 10, and a signal terminal 11 for posting the state of the battery pack 1 from the management circuit portion 5 to the main unit 2. Reference characters D1 to D3 designate diodes for preventing a back-flow of an electric current.

The pack power supply control circuit 19 is operative to control the supply and interruption of electric power to the protection circuit portion 4 and the management circuit portion 5. The power supply control circuit 19 controls the on/off of the power supply for the circuits in the battery pack 1 according to a signal inputted from the WAKE—UP—POWER terminal 7 for activating the power supply.

Figure 4A:
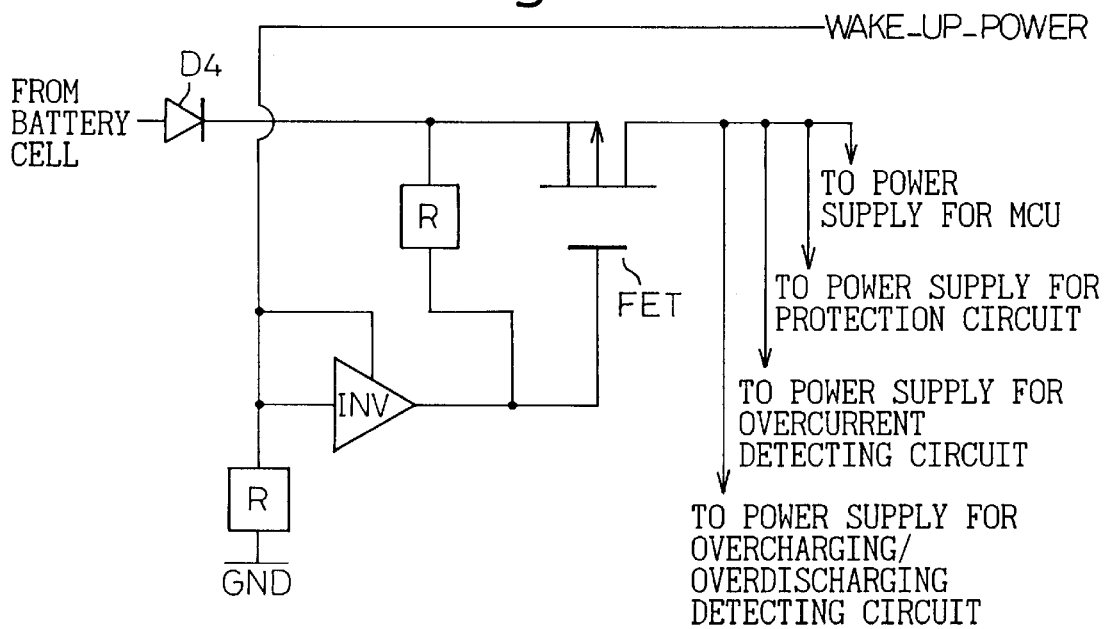
FIGS. 4A and 4B are diagrams illustrating the constitution of a pack power supply control circuit illustrated in FIG. 3.
Figure 4B:
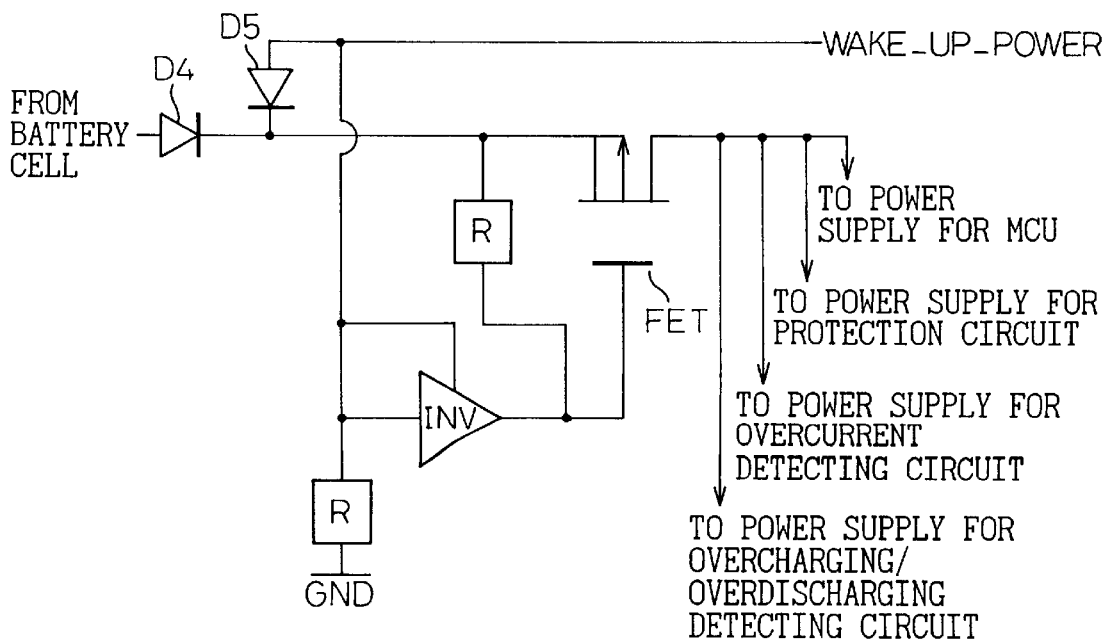

FIGS. 4A and 4B are schematic diagrams illustrating the pack power supply control circuit 19.

As shown in FIG. 4A, the battery 3 is connected to the MCU circuit 18, the protection circuit 14, the overcurrent detecting circuit 13, and the overcurrent discharging detecting circuit 15 through the diode D4 and the field effect transistor FET. The WAKE—UP—POWER terminal is connected to the gate of the FET through an inverter INV.

When the battery pack 1 is present as a discrete device, or when the main power supply unit 12 is off even if the battery pack 1 is attached to the main unit 2, no voltage is applied to the WAKE—UP—POWER terminal 7, so that the gate of the FET is at a high level owing to the battery voltage. Thus, the FET is in a nonconducting state. When the main power supply switch 12 of the main unit 2 is turned on, and the voltage of the power supply activating signal is applied to the WAKE—UP—POWER terminal 7, the FET is in a conducting state, with the result that electric power is supplied to each of the parts of the protection circuit portion 4 and the management circuit portion 5 from the battery.

Thus, when the battery pack 1 is unused, all power supplies for the protection circuit portion 4 and the management circuit portion 5 in the battery pack 1 are turned off, so that the power consumption due to the self discharge is 0. When the battery pack 1 is used, all the power supplies for the protection circuit portion 4 and the management circuit portion 5 in the battery pack 1 are turned on by applying a voltage from the system to the WAKE_UP_POWER terminal 7. Thus, the battery pack 1 is enabled to perform a normal operation. Even when the battery pack 1 is present as a discrete one, the power supplies for the internal circuits of the battery pack 1 are tuned off, so that the self discharge of the battery pack 1 is minimized.

When neither an AC adapter nor another battery is present in the main unit 2, the power supply for the apparatus is not activated because of the fact that no voltage is applied to the WAKE—UP—POWER terminal 7 even if the main power supply switch 12 is turned on. Thus, the BATTERY POWER terminal 8 is provided in the battery pack 1 and connected to the WAKE—UP —POWER terminal 7 through the main power supply switch 12. Consequently, even if neither an AC adapter nor another battery is provided in the power supply system of the apparatus, a voltage can be supplied to the WAKE—UP—POWER terminal 7 owing to the electric power fed from the battery pack 1. This enables the pack power supply control circuit 19 to perform a power supply control operation.

Further, as illustrated in FIG. 4B, the WAKE—UP—POWER terminal 7 of the pack power supply control circuit 19 can be connected to a line from the battery 3 through a diode D5. Thus, even when the terminal voltage of the battery 3 is almost 0, electric power, which is needed by the circuits in the battery pack 1, is supplied from another battery or the AC adapter. Consequently, the protection circuit portion 4 and the management circuit portion 5 can be operated normally.

In the battery pack shown in FIG. 2, when the battery 3 is charged, a battery charger (not shown) is connected between the charging/discharging terminal (POW) 9 and the ground terminal (GND) 10 in a state in which the protection circuit portion 4 and the management circuit 5 operate. The management circuit portion 5 performs a control operation for precharging (namely, charging by using a small current) for a short time (of several seconds to several minutes or so). Further, the management circuit portion 5 monitors the manner of a change in the battery voltage just after that. Then, the management circuit portion 5 judges whether or not the battery is defective. When a drop in the voltage is large, the management circuit portion 5 judges that the battery is defective. In the case that such a judgement is indefinite, the battery is precharged by lengthening a precharging time or increasing a charging current a little. Then, the management circuit portion 5 judges whether or not such a battery is defective. When it is determined that the battery is non-defective, a full-scale charging operation is performed. Hitherto, this precharging method has been well known. Thus, the detailed description of this precharging method is omitted herein. Incidentally, it is assumed that the voltage to be applied to the WAKE—UP POWER—terminal 7 is not less than an operation assurance power supply voltage +VF. When the battery voltage becomes higher than the voltage at the WAKE—UP—POWER terminal 7 as a result of progress in charging the battery, a power supply current is supplied from the battery 3. According to this embodiment, a charging current and a battery voltage can be measured by using the power supplied from the WAKE—UP—POWER terminal 7, regardless of whether or not the battery is defective, even when the battery pack is in an overdischarged state. Consequently, the management circuit portion can suitably judge whether or not the battery is defective.

In the case that the MCU circuit 18 of the management circuit portion 5 controls the detecting circuits and the protection circuits of the protection circuit portion 4 similarly as in the prior art, the charging and discharging sometimes cannot be performed even if the protection circuit portion 4 operates normally, when a bug or a failure occurs in the firmware of the MCU circuit 18. Furthermore, sometimes an overcurrent, overcharge or overdischarge is not correctly detected. To solve such a problem, the protection circuit portion 4 is constituted in such a manner as to operate without being controlled by the MCU circuit 18 of the management circuit portion 5.

The detecting circuits and the protection circuits of the protection circuit portion 4 singly detect overcharge, overdischarge, and overcurrent conditions without undergoing the interference of the MCU circuit 18. The protection circuit portion 4 outputs status data and data representing measured values (namely, monitor data) to the MCU circuit 18. Then, the MCU circuit 18 receives the status data and the data representing the measured values. Subsequently, the MCU circuit 18 communicates with the system power supply control portion 6 of the main unit 2. Thus, even if a bug occurs in the firmware of the MCU circuit 18, the protection circuit portion 4 for detecting anomalies and protecting the battery pack operates without being affected by the bug. Similarly, even when a runaway occurs in the MCU circuit 18 owing to a failure, the protection circuit portion 4 operates without being affected by the runaway.

Figure 5:
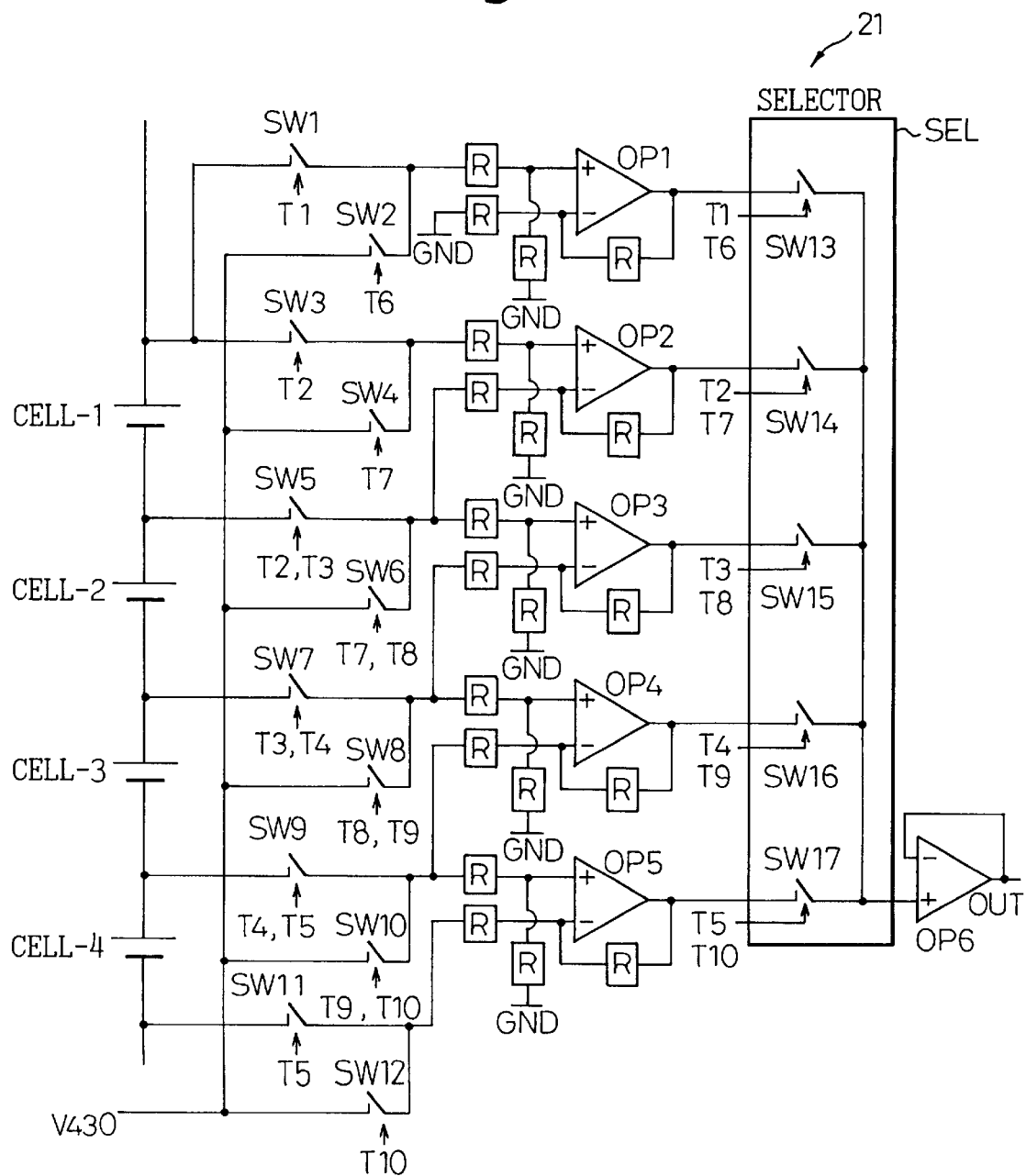
FIG. 5 is a circuit diagram illustrating the constitution of a first example of cells and a pack voltage monitoring circuit illustrated in FIG. 3.
Figure 6B:
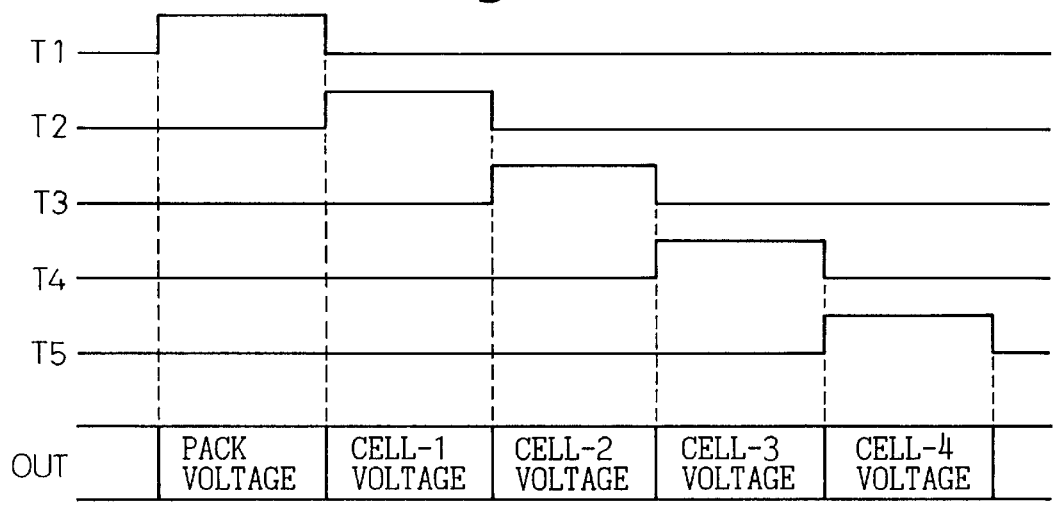
Figure 6C:
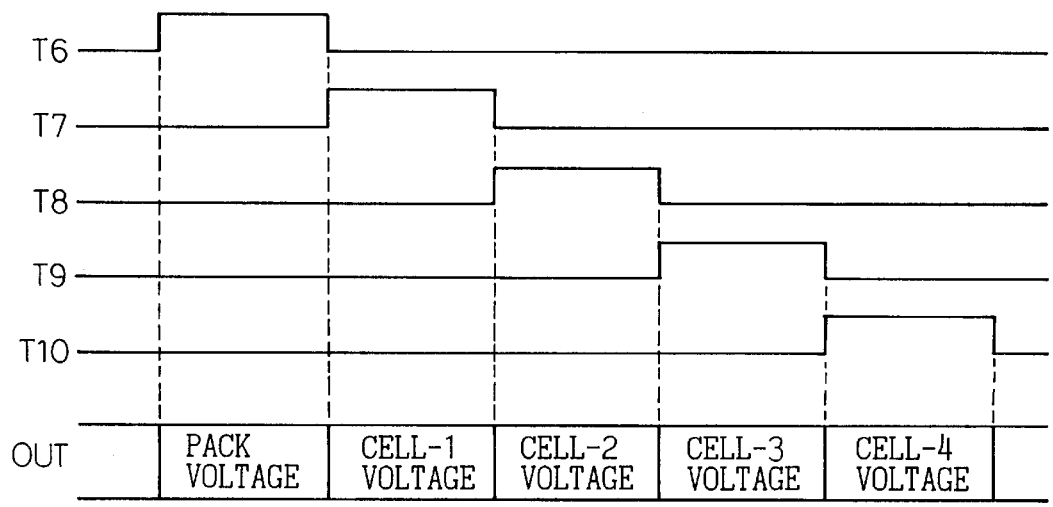

FIG. 5 illustrates the constitution of a first example of the cell-and-pack voltage monitoring circuit 21. FIGS. 6A to 6C illustrate an operation of this circuit.

The battery 3 consists of four battery cells CELL-1 to CELL-4. Electric power is inputted from each of the cells CELL-1 to CELL-4 to operational amplifiers OP1 to OP5 through a corresponding one of switches SW1 to SW11 and corresponding resistors R. A voltage V430 of 4.3 V generated by the voltage regulator circuit 24 is inputted to the other input terminal of each of operational amplifiers OP1 to OP5. The on/off of the switches SW1 to SW11 is controlled according to output timing signals T1 to T10 (to be described later). Outputs of the operational amplifiers OP1 to OP5 are selected by a selector SEL, and subsequently, the selected outputs are inputted to an operational amplifier OP6.

FIGS. 6A and 6B illustrate outputs from the OUT terminal of the operational amplifier OP6, that is, a monitor output of a pack voltage corresponding to a timing signal T1, a monitor output of a voltage of a cell CELL-1 of the battery 3, which corresponds to a timing signal T2, a monitor output of a voltage of a cell CELL-2 of the battery 3, which corresponds to a timing signal T3, a monitor output of a voltage of a cell CELL-3 of the battery 3, which corresponds to a timing signal T4, and a monitor output of a voltage of a cell CELL-4 of the battery 3, which corresponds to a timing signal T5. Moreover, as shown in FIGS. 6A to 6C, the outputs from the OUT terminal of the operational amplifier OP6 include a calibration output of a pack voltage monitoring circuit, which corresponds to a timing signal T6, a calibration output of a voltage of a CELL-1 voltage monitoring circuit, which corresponds to a timing signal T7, a calibration output of a CELL-2 voltage monitoring circuit, which corresponds to a timing signal T8, a calibration output of a voltage of a CELL-3 voltage monitoring circuit, which corresponds to a timing signal T9, and a calibration output of a CELL-4 voltage monitoring circuit, which corresponds to a timing signal T10.

Figure 8B:
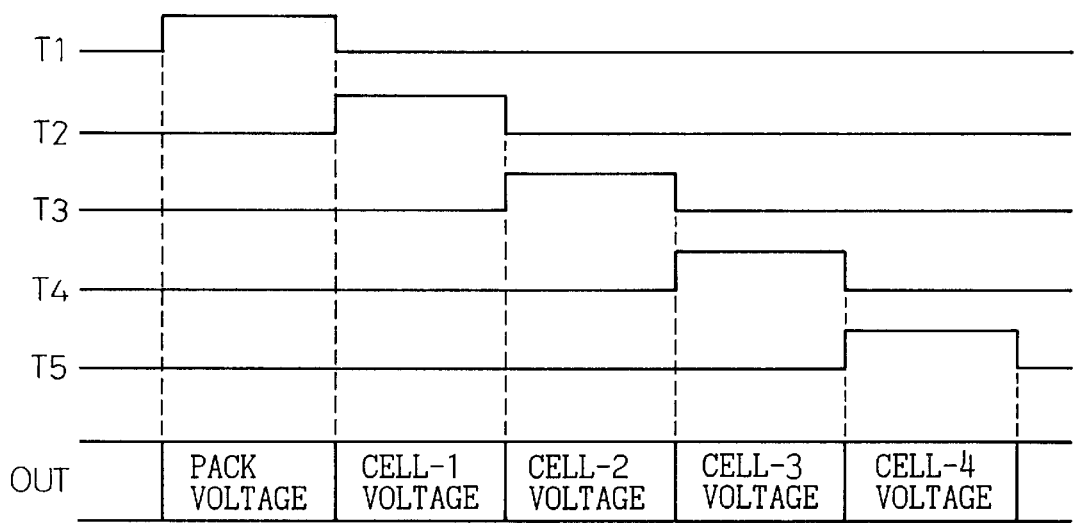
Figure 8C:
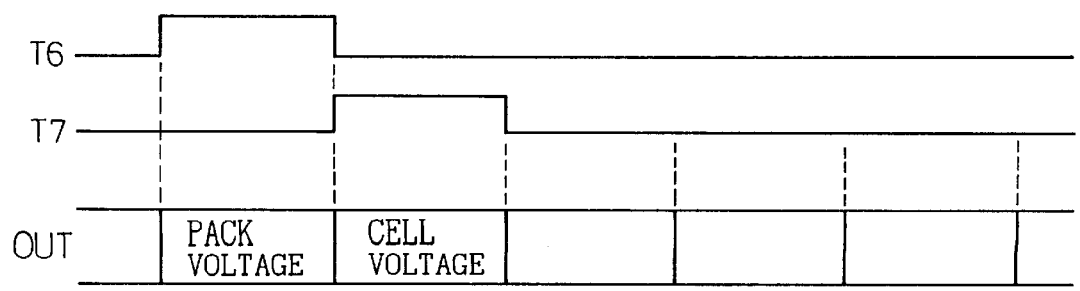

FIG. 7 illustrates the constitution of a second example of the cell-and-pack voltage monitoring circuit 21. FIGS. 8A to 8C are timing charts illustrating an operation of this circuit 21.

The CELL-1 voltage monitoring circuit to the CELL-4 voltage monitoring circuit, and the pack voltage monitoring circuit 21 may be constituted as illustrated in FIG. 7. Although operational amplifiers OP1 to OP5 are prepared for measuring the pack voltage and each of cell voltages and outputs of these amplifiers are selectively outputted by the selector SEL in the case of the example of the aforementioned circuits of FIG. 5, a calibration output of each of the cells is omitted, as is seen from FIGS. 8A to 8C, and thus the constitution of the circuit is simplified in the case of the example of FIG. 7. Therefore, the operational amplifier OP' is used in common among the voltage monitor outputs and the calibration outputs.

Figure 9A:
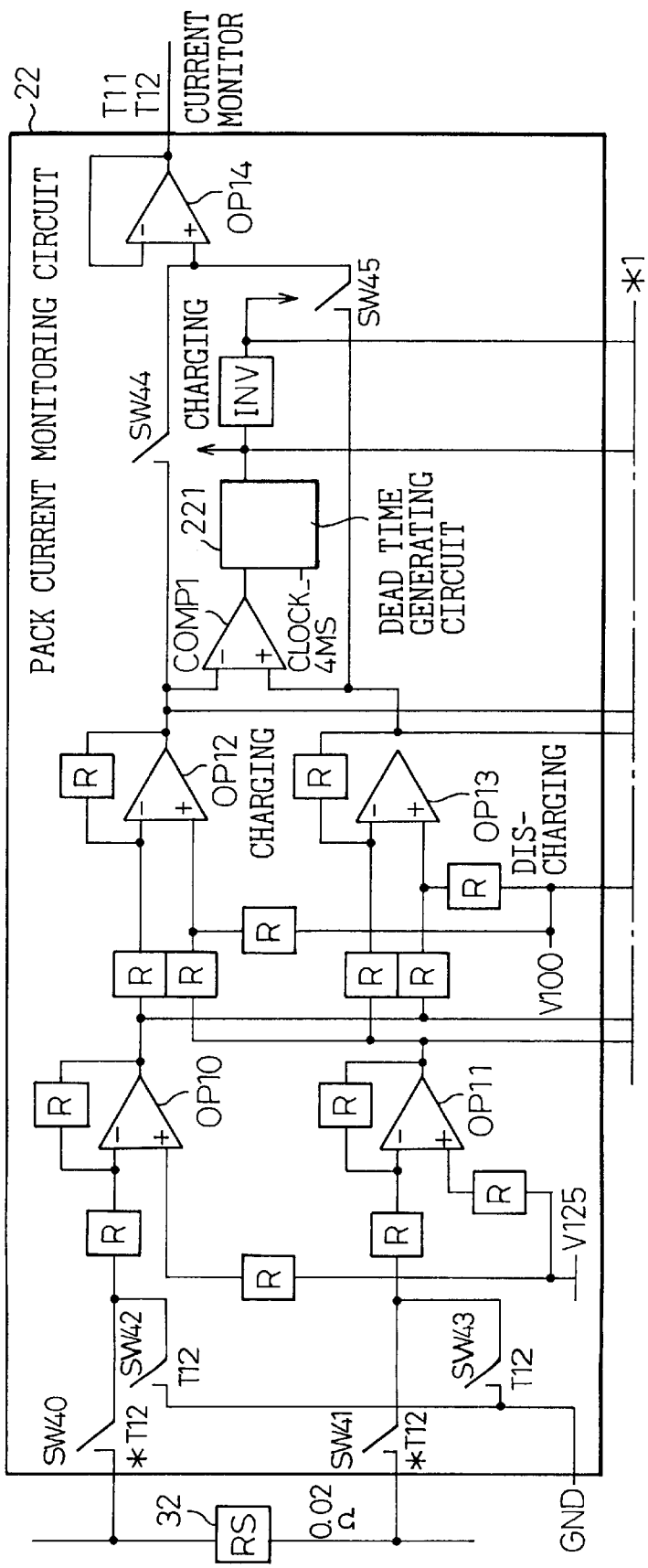
FIGS. 9A and 9B are circuit diagrams illustrating the constitution of a first example of a pack current monitoring circuit and an overcurrent detecting circuit.
Figure 9B:
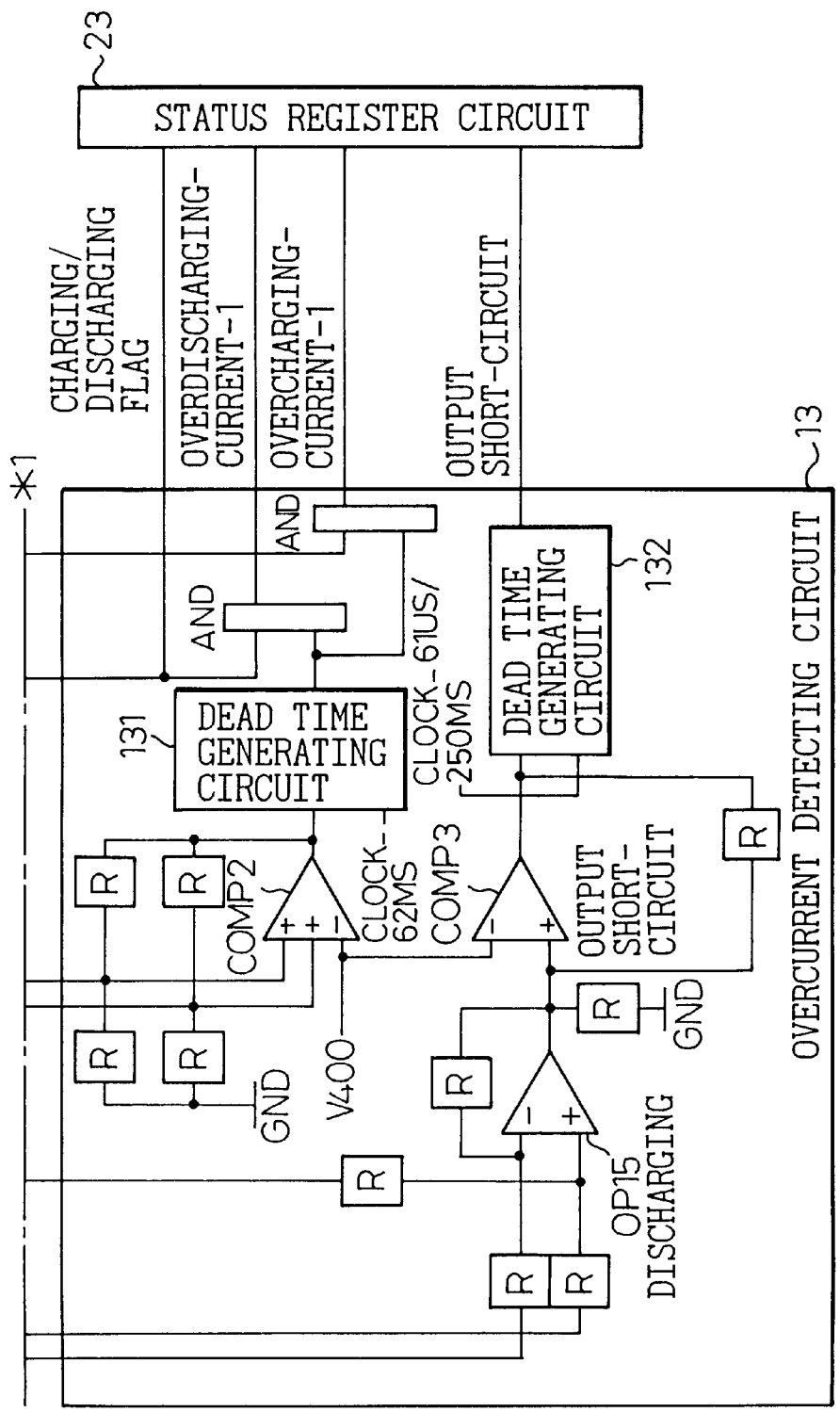

FIG. 9 illustrates the constitution of a first example of each of a pack current monitoring circuit 22 and an overcurrent detecting circuit 13.

FIG. 10 illustrating the output timing of the pack current monitoring circuit 22.

As shown in FIG. 9, a charging current sensing circuit and a discharging current sensing circuit have the same circuit constitution as in the pack current monitoring circuit 22. Operational amplifiers OP10 and OP11 are respectively connected to both sides of a current detecting resistor 32 in such a manner as to be symmetrical with respect thereto. Further, operational amplifiers OP12 and OP13 are provided therein in such a manner as to be connected to outputs of the amplifiers OP10 and OP11 at the inverting terminals thereof so that the polarities of the outputs thereof are inverted. A current monitor signal, whose signal level is proportional to the absolute value of electric current is outputted from the operational amplifier OP14 with the timing T11 at each of discharging and charging operations.

A comparator COMP1 is used to discriminate between the charging direction and the discharging direction of flow of the electric current. A dead time generating circuit 221 adapted to generate a dead time of, for example, 15.6 ms is connected to an output of the comparator COMP1. Thus, even when the state of the main unit 2 is changed into the sleep mode in which the current consumption is minute, a reliable detection of an overcurrent is achieved. A signal representing a charging/discharging flag is outputted from this dead time generating circuit 221 to a status register circuit 23.

The operational amplifiers OP10 and OP11 are respectively connected with the calibration output timing T12 to the ground GND through switches SW42 and SW43. Thus, a calibration output is obtained from the operational amplifier OP14. The aforementioned current monitoring operation is performed with the timing *T12 other than the timing T12.

A current monitoring method is performed according to the following conditions. The charging current sensing circuit and the discharging current sensing circuit have the same circuit constitution. These sensing circuits have almost the same layout in the LSIs. Thus, these sensing circuits have nearly the same characteristics. Therefore, when electric current flows through these sensing circuits, this inevitably causes a difference in output voltage between these sensing circuits. This difference can be distinguished by the comparator COMP1 dedicated thereto. For instance, when a minute current flows therethrough, an output of the charging current sensing circuit is shifted in a positive direction. Conversely, an output of the discharging current sensing circuit is shifted in a negative direction (alternatively, the output of this sensing circuit is outside a detectable range, so that there is no change in the output thereof). Thus, the comparator identifies a charging state.

This current monitoring circuit obtains electric power from the battery pack 1. Therefore, when this current monitoring circuit operates, it is impossible to cause the case that neither charging current nor discharging current flows therethrough. However, to discriminate between the charging state and the discharging state caused at low current without being affected by noises, the comparator circuit has a dead time generating circuit 221, which is provided at a rear portion thereof and does not output a signal representing a change in the state until a predetermined time elapses since the state of the unit is changed into the charging state or the discharging state. Even when the state of the unit is changed into the sleep mode, and the current consumption is minute, the unit can identify (or hold) the discharging state with reliability by using this dead time generating circuit 221.

If the state of the unit is identified as the charging state, an output of the charging current sensing circuit is employed as the output of the current monitoring circuit. Conversely, if the state of the unit is identified as the discharging state, an output of the discharging current sensing circuit is employed as the output of the current monitoring circuit.

Figure 11A:
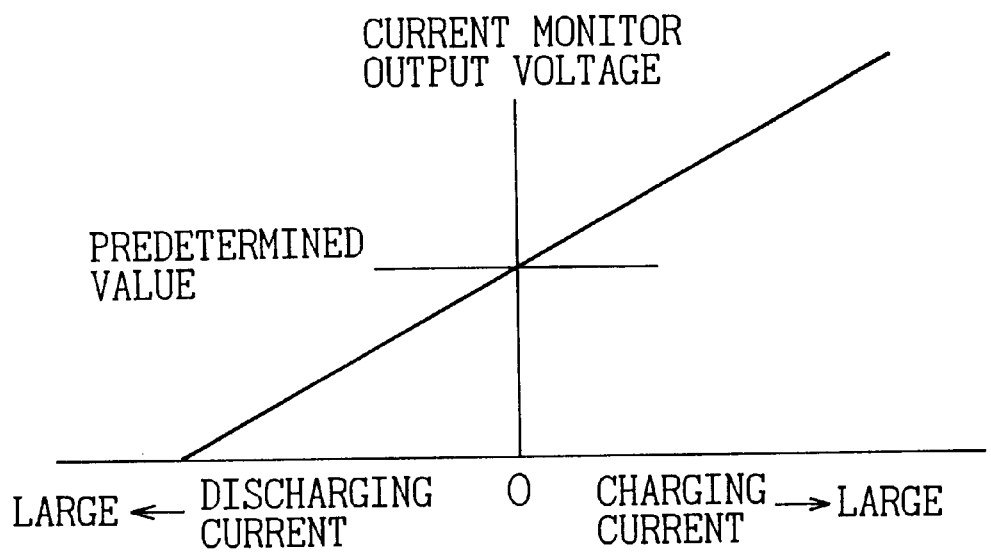
FIG. 11A is a graph illustrating a conventional current monitoring method.
Figure 11B:
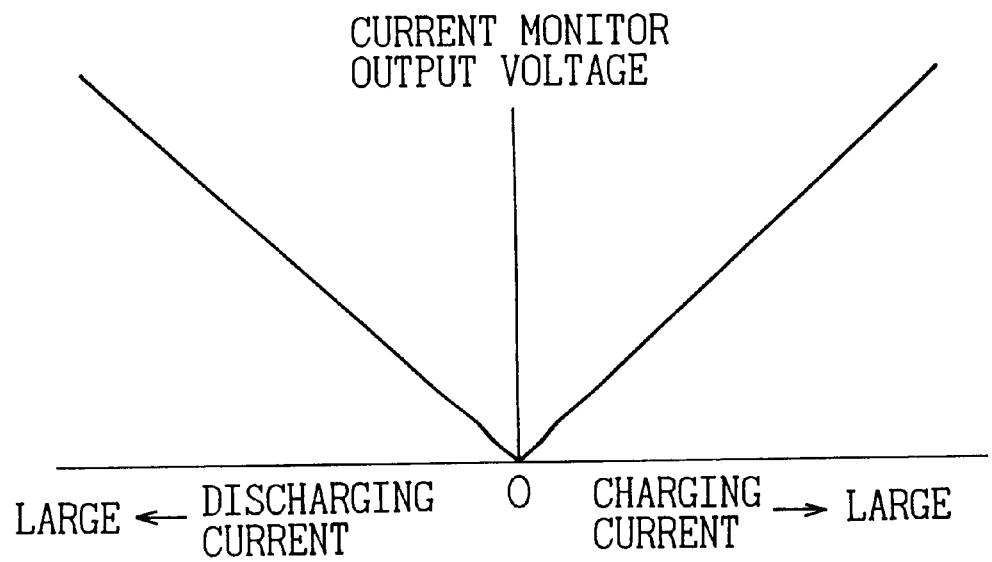
FIG. 11B is a graph illustrating a current monitoring method of the present invention.

A supplemental description of the current monitoring method according to the present invention will be provided hereinbelow by referring to FIGS. 11A and 11B. As illustrated in FIG. 11A, the prior art circuit identifies the detected current as the charging current, when the current monitor output voltage is not less than a predetermined value. Further, when the current monitor output voltage is less than the predetermined value, the prior art circuit identifies the detected current as the discharging current. Thus, the prior art circuit has a drawback in that the state of the unit cannot be accurately identified as the charging state or the discharging state, owing to noises, circuit characteristics, and variation in processes, when the magnitude of the current is in the vicinity of the predetermined value and nearly equal to 0. Furthermore, the prior art circuit has another drawback in that when an analog monitor output value is converted into a digital value, the dynamic range of an A/D converter covers the change in the current monitor output voltage between the charging state and the discharging state, and the quantization error caused at an A/D conversion is large.

The circuit of the present invention as illustrated in FIG. 9 is adapted to output a monitor voltage, whose magnitude is proportional to the absolute value of the current, at each of the charging operation and the discharging operation. Namely, as illustrated in FIG. 11B, the current monitor output voltage is outputted in such a manner as to have an absolute value that is proportional to the magnitude of the current. The discrimination between the charging current and the discharging current is performed by a difference comparator. Thus, the aforementioned drawbacks of the prior art circuit are eliminated.

As illustrated in FIG. 9, the overcurrent detecting circuit 13 detects an overcurrent, whose magnitude exceeds that of the rated current, by causing a comparator COMP2 to compare an output of each of the operational amplifiers OP12 and OP13 with a reference voltage of 4.0 V. A dead time generating circuit 131 adapted to generate a dead time of, for instance, 250 ms is connected to an output terminal of the comparator COMP2. Thus, the detection of the current is achieved with reliability. When the discharging of the battery is performed, the comparator COMP2 outputs a current, which is indicated by "OVERDISCHARGING-CURRENT-1", to the status register circuit 23. When the charging of the battery is performed, the comparator COMP2 outputs a current, which is indicated by "OVERCHARGING-CURRENT-1", to the status register circuit 23.

Further, the operational amplifier 15, whose gain differs from that of the operational amplifier 13, is connected to the operational amplifiers OP10 and OP11. Then, an output short-circuit current is detected by causing the comparator COMP3 to compare the output of this amplifier 15 with the reference voltage of 4.0 V. Incidentally, the threshold value for detecting an overcurrent is changed by using the same reference voltage and changing the gain of the amplifier. A dead time generating circuit 132 is provided at the output side of the comparator COMP3. The dead time generated by this dead generating circuit 132 is set at an extremely short time. An output of the dead time generating circuit 132 is outputted to the status register circuit 23.

The overcurrent detecting method has the following effects. Even when the first overcurrent detecting means and the second overcurrent detecting means malfunction, the protection function utilizing the blowout of a fuse works with reliability. The two systems of the overcurrent detecting means are provided in the unit. In the case of the former detecting means, the detection response time is shortened because the influence of the overcurrent is large even when the duration is short. Conversely, in the case of the latter detecting means, the detection response time is lengthened in view of the influence of the long duration.

Figure 12:
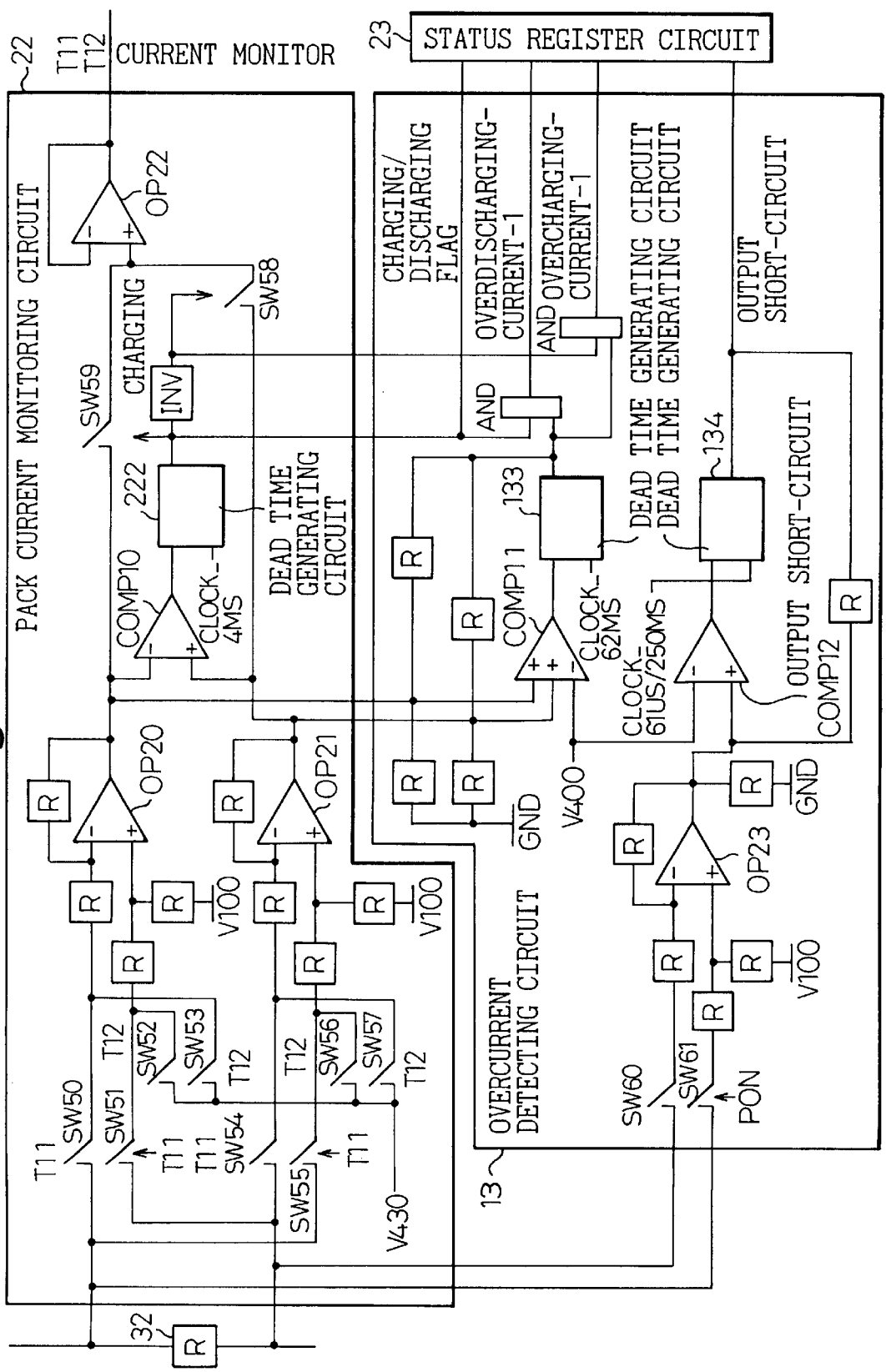
FIG. 12 is a circuit diagram illustrating the constitution of a second example of the pack current monitoring circuit and the overcurrent detecting circuit.

FIG. 12 illustrates the constitution of a second example of each of the pack current monitoring circuit 22 and the overcurrent detecting circuit 13. Incidentally, the output timing of the pack current monitoring circuit is similar to that illustrated in FIG. 10.

In this case, both the voltages at both ends of the current detecting resistor 32 are inputted to the operational amplifiers OP20 and OP21 by inverting the polarities thereof, respectively with the timing T11. Thus, the charging current sensing circuit and the discharging current sensing circuit are made to have the same circuit constitution. A current monitor signal representing the value, which is proportional to the absolute value of the current, is outputted with the timing T11 from the operational amplifier OP22 at each of the charging and discharging operations.

The comparator COMP10 identifies the direction of flow of the detected current as the charging direction or the discharging direction. A dead time generating circuit 222 having a dead time of, for example, 15.6 ms is connected to an output terminal of the comparator 10. This enables the detection of an overcurrent even when the state of the main unit 2 is changed to the sleep mode, in which the current consumption is minute. An output signal of this dead time generating circuit 222 is outputted to the status register circuit 23 as a signal representing a charging/discharging flag.

The overcurrent detecting circuit 13 cases the comparator COMP1 to compare an output voltage of each of the operational amplifiers OP20 and OP21 with the reference voltage of 4.0 V. Thus, an overcurrent caused by an overload on a rated current is detected. A dead time generating circuit 133 generating a dead time of, for instance, 250 ms is provided at the output side of the comparator COMP11. Consequently, the reliability of the detection is enhanced. When the discharging of the battery is performed, the comparator COMP11 outputs a current, which is indicated by "OVERDISCHARGING-CURRENT-1", to the status register circuit 23. When the charging of the battery is performed, the comparator COMP11 outputs a current, which is indicated by "OVERCHARGING-CURRENT-1", to the status register circuit 23.

Further, the operational amplifier 23, whose gain differs from those of the operational amplifiers 20 and 21, is connected to both terminals of the current detecting resistor 32. Then, an output short-circuit current is detected by causing the comparator COMP12 to compare the output of this amplifier 23 with the reference voltage of 4.0 V. Incidentally, similarly to the case of the example illustrated in FIG. 9, the threshold value for detecting an overcurrent is changed by using the same reference voltage and changing the gain of the amplifier. A dead time generating circuit 134 is provided at the output side of the comparator COMP12. The dead time generated by this dead generating circuit 134 is set at an extremely short time. An output of the dead time generating circuit 134 is outputted to the status register circuit 23.

The doubling of the overcurrent detecting means enables the detection of a large overcurrent in a short time, and the detection of a relatively small overcurrent only in the case of the long duration. Thus, the meticulous and reliable protection of a battery pack is realized. Even if the threshold values for detecting an overcurrent are set at the same value in the circuit, the threshold value for detecting an overcurrent is changed by changing the gain of the amplifier. Thus, the reference power supply circuit can be used in common between the first overcurrent detecting means and the second overcurrent detecting means. An overcurrent can be detected by using an average value of the magnitude of the current, when the detection response time is determined owing to the band limitation of the amplifier. Consequently, an erroneous detection can be prevented from occurring owing to noises.

Figure 13:
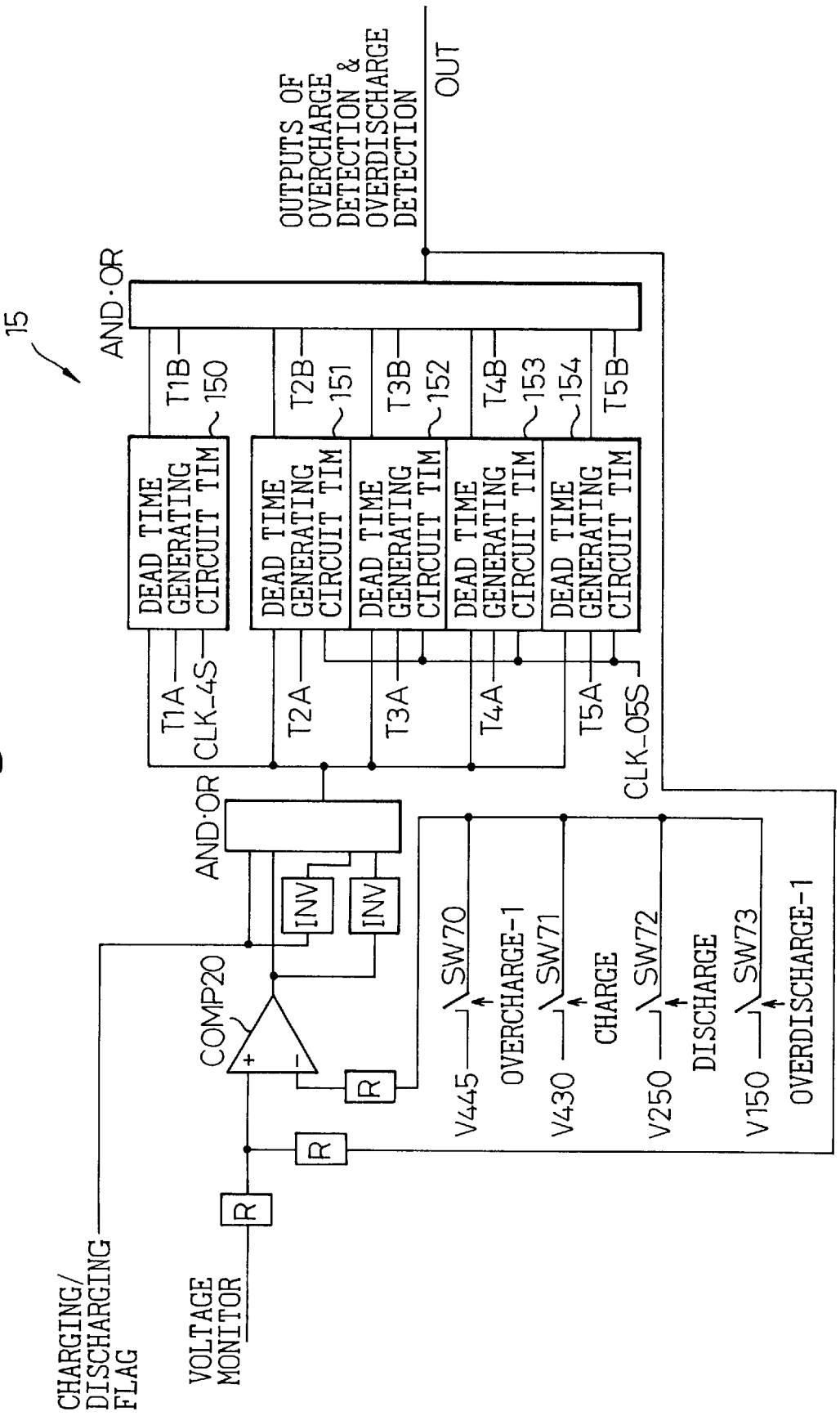
FIG. 13 is a circuit diagram illustrating the constitution of an example of an overcharge/overdischarge detecting circuit.
Figure 14:
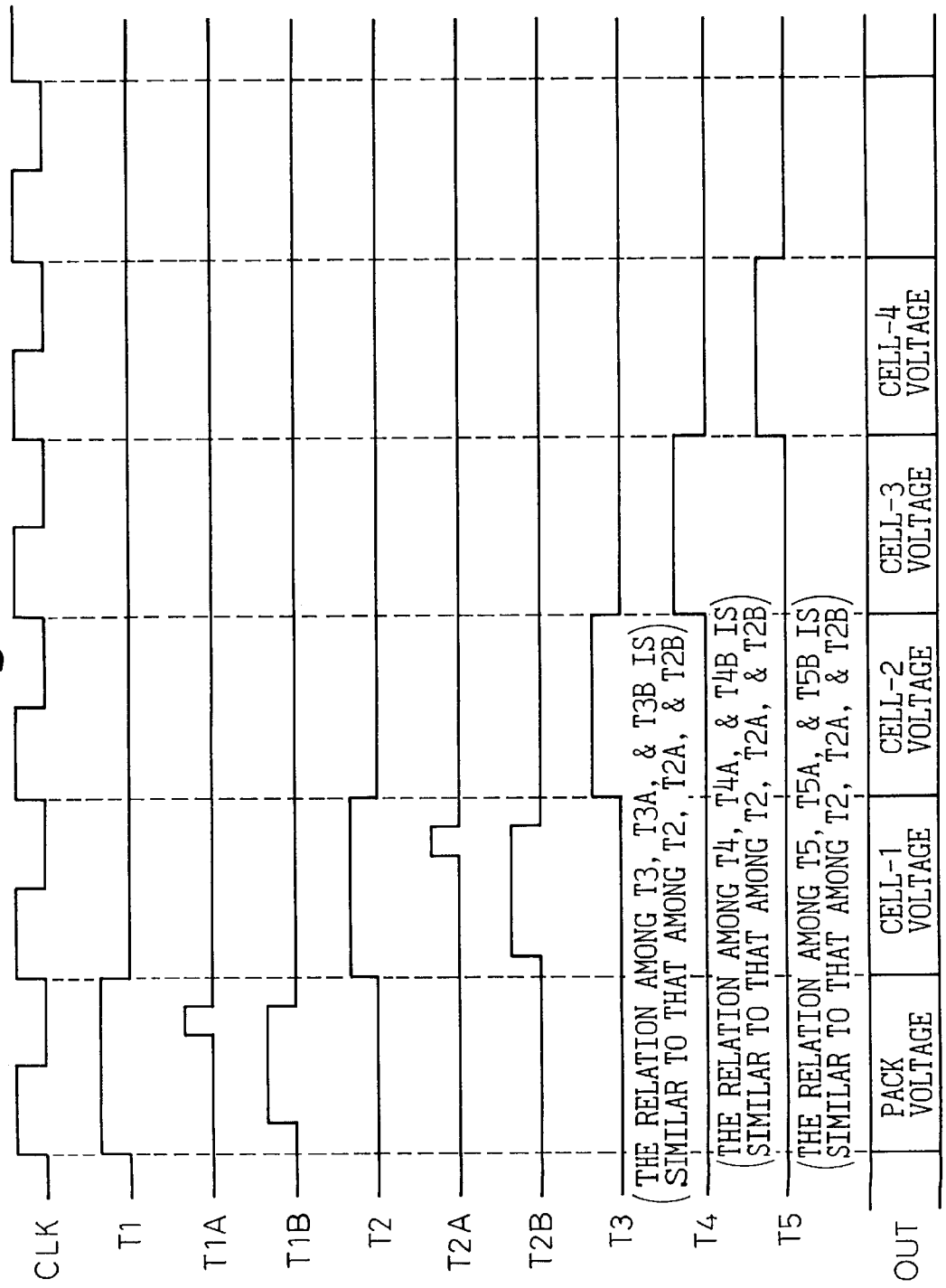
FIG. 14 is a timing chart illustrating operation timing of the circuit illustrated in FIG. 13.

FIG. 13 illustrates the constitution of an example of the overcharge/overdischarge detecting circuit 15. FIG. 14 is a timing chart illustrating an operation of this circuit.

The overcharge/overdischarge detecting circuit 15 causes the comparator COMP20 to compare a voltage monitor output, which is detected by the cell-and-pack voltage monitoring circuit 21, with the reference voltage. The reference voltage for this comparator COMP21 is changed according to an operation mode. In a usual charging state, the reference voltage V430, which is 4.3 V, is connected to this comparator, and an overcharge OVERCHARGE-1 is detected. When this OVERCHARGE-1 is detected, a reference voltage V445, which is 4.45V, is connected to this comparator, an overcharge OVERCHARGE-2 is detected. Furthermore, in a usual discharging state, a reference voltage V250 of a 2.5 V is connected to this comparator, an overdischarge OVERDISCHARGE-1 is detected. When this OVERDISCHARGE-1 is detected, a reference voltage V250, which is 2.5 V, is connected to this comparator. Thus, an overdischarge OVERDISCHARGE-2 is detected.

An inverter INV and an AND.OR-circuit are used to compute the AND of the charging/discharging flag and a voltage monitor value indicated by the voltage monitor signal, and the AND of the negated charging/discharging flag and the negated voltage monitor value, and finally compute the OR of both of resultant values of the AND operations.

Outputs from the OUT terminal of the overcharge/overdischarge detecting circuit 15 are an overcharge or overdischarge detecting output of a pack voltage corresponding to a timing signal T1, an overcharge or overdischarge detecting output of a voltage of a cell CELL-1 of the battery 3, which corresponds to a timing signal T2, an overcharge or overdischarge detecting output of a voltage of a cell CELL-2 of the battery 3, which corresponds to a timing signal T3, an overcharge or overdischarge detecting output of a voltage of a cell CELL-3 of the battery 3, which corresponds to a timing signal T4, and an overcharge or overdischarge detecting output of a voltage of a cell CELL-4 of the battery 3, which corresponds to a timing signal T5.

Moreover, reference characters T1A and T1B designate signals generated from the timing signal T1, as shown in FIG. 14. Reference characters T2A, T2B, T3A, T3B, . . . designate signals similar to the signals T1A and T1B.

The dead time generating circuits 150 to 154, each of which operates in synchronization with the detection timing, are provided and incorporated into the overcharge/overdischarge detecting circuit 15. The dead time generating circuit 150 is operative to generate a dead time for detecting an overcharge/overdischarge correspondingly to a pack voltage. The circuit 150 generates a dead time for detecting an overdischarge, which is, for example, 32 seconds. A signal CLK_4S is a clock signal, whose period is 4 seconds.

The dead time generating circuits 151, 152, 153, and 154 are circuits that generate a dead time for detecting an overcharge/overdischarge and respectively correspond to the cells CELL-1, CELL-2, CELL-3, and CELL-4 of the battery 3. These dead time generating circuits 151, 152, 153, and 154 receive clock signals CLK_05S, whose period is 0.5 seconds, and establish a dead time corresponding to an overcharge, which is 2 seconds, and a dead time corresponding to an overdischarge, which is 2 seconds.

Figure 15:
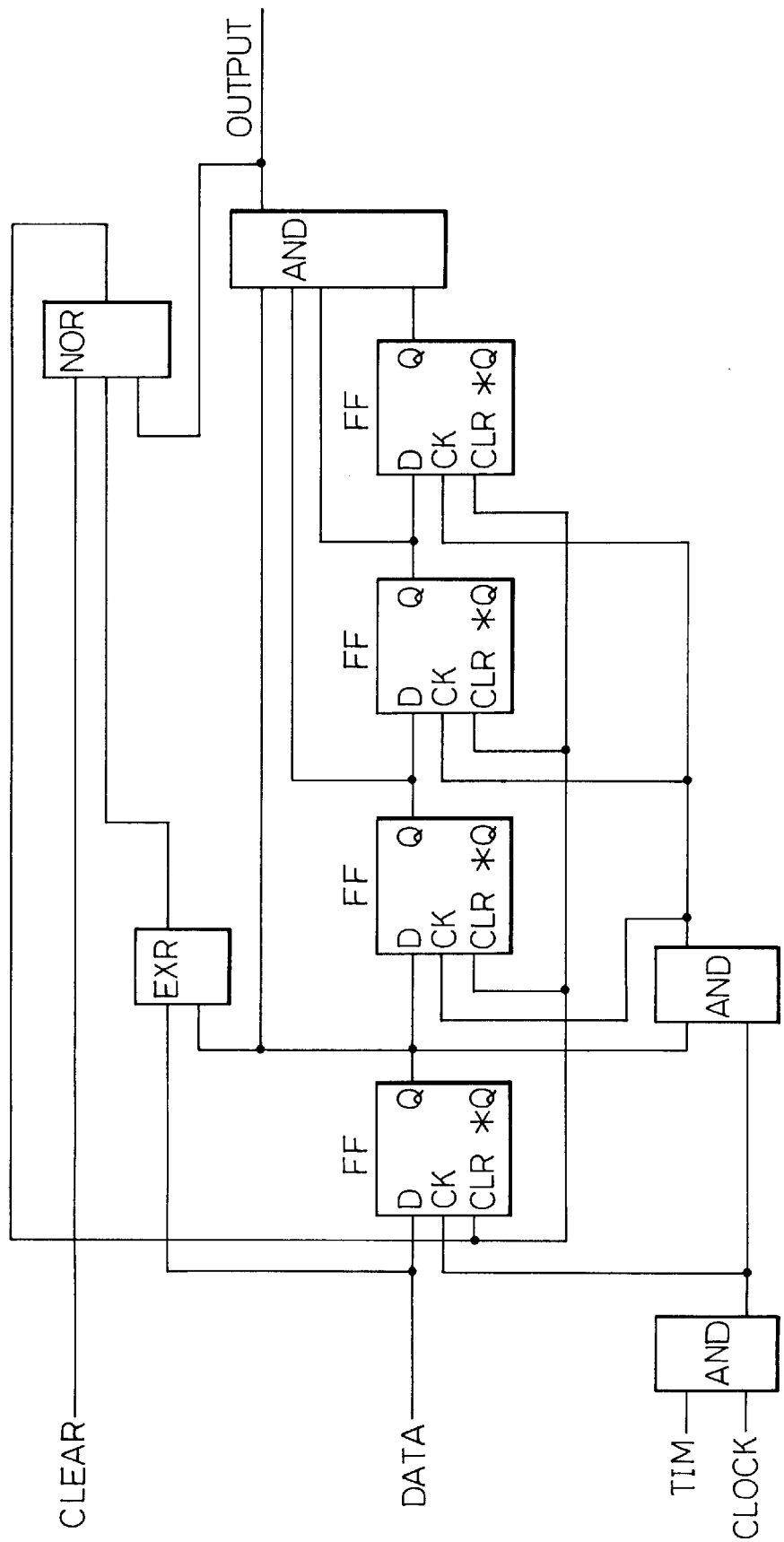
FIG. 15 is a circuit diagram illustrating the constitution of a first example of a dead time generating circuit.

FIG. 15 illustrates the constitution of a first example of the dead time generating circuit. As shown in this figure, a circuit consisting of D-type flip-flops FF, an exclusive-OR circuit EXOR, a NOR circuit NOR, and AND circuits AND continues sampling according to clock signals for generating input data DATA from input signals CLOCK and TIM. When all results of four consecutive sampling operations represent a high level High, the level of an output OUTPUT thereof is set at a high level High. If the input data represents a low level LOW, the input of clock signals CK for the flip-flops provided at the second and later stage are stopped. Further, if the input data DATA changes, so that an output Q of the flip-flop FF of the first stage is not matched with the input data DATA, all flip-flops FF are cleared.

Similarly as in the case of the prior art circuit, the comparators used in the detecting circuits are adapted to have hysteresis characteristics so as to prevent an erroneous detection from occurring in each of the overcharge/overdischarge detecting circuit 15 and the overcurrent detecting circuit 13 owing to an abrupt change in the load and the generation of transient currents and impulse noises at the time of detachment/attachment of the battery pack. Furthermore, a circuit imparting a detection dead time is incorporated into an LSI constituting the protection circuit portion 4. Needless to say, this circuit requires an area that is smaller than the area necessary for the low-pass filter having CR elements.

Each of the detecting circuits continues sampling outputs of the corresponding comparator, and definitely decides that a certain logical level is detected, only when the certain logical level is detected consecutively a predetermined number of times. Then, each of the detecting circuits outputs a signal representing such a decision. This prevents an occurrence of an erroneous detection caused by a change in the level, which does not continue for a time period corresponding to a predetermined number of times of sampling, for instance, a sudden change in the load, the generation of a transient current at the time of detachment/attachment, and an occurrence of an impulse noise. The dead time generating circuit can be constituted by a small-scale digital circuit, and can be incorporated into an LSI almost regardless of the chip size of the LSI. Further, the dead time can easily be altered simply by changing the clock frequency for sampling. Consequently, the circuit can be used in common among various portions.

Figure 16:
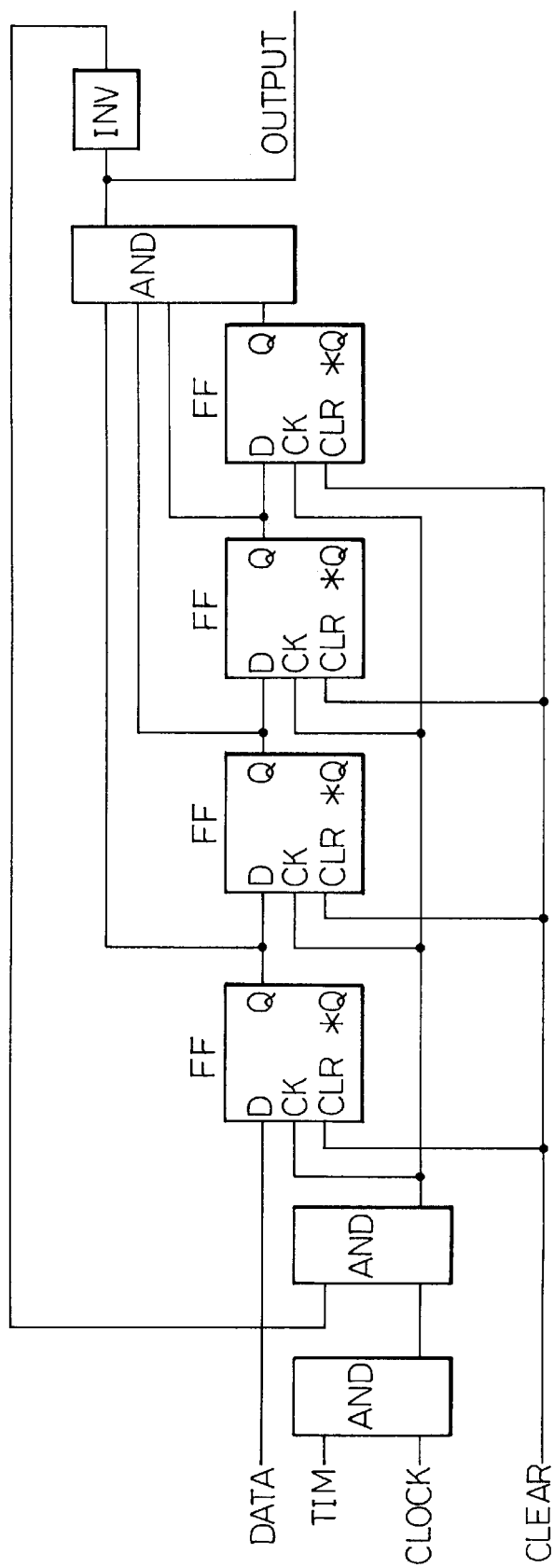
FIG. 16 is a circuit diagram illustrating the constitution of a second example of a dead time generating circuit.

FIG. 16 illustrates the constitution of a second example of the dead time generating circuit. This circuit continues sampling according to clock signals for generating input data DATA from input signals CLOCK and TIM. When all results of four consecutive sampling operations represent a high level High, this circuit stops the input of clock signals and latches such a state. Output signals OUTPUT are latched in such a manner as to have a high level High. If the clearing input data is once set at a low level LOW, all the flip-flops FF are cleared. Thus, input clock signals CK are enabled, so that the level of the input clearing signals CLEAR is returned to a high level High. At that time, the circuit is returned to a state in which the circuit repeats the sampling of input data DATA.

Figure 17:
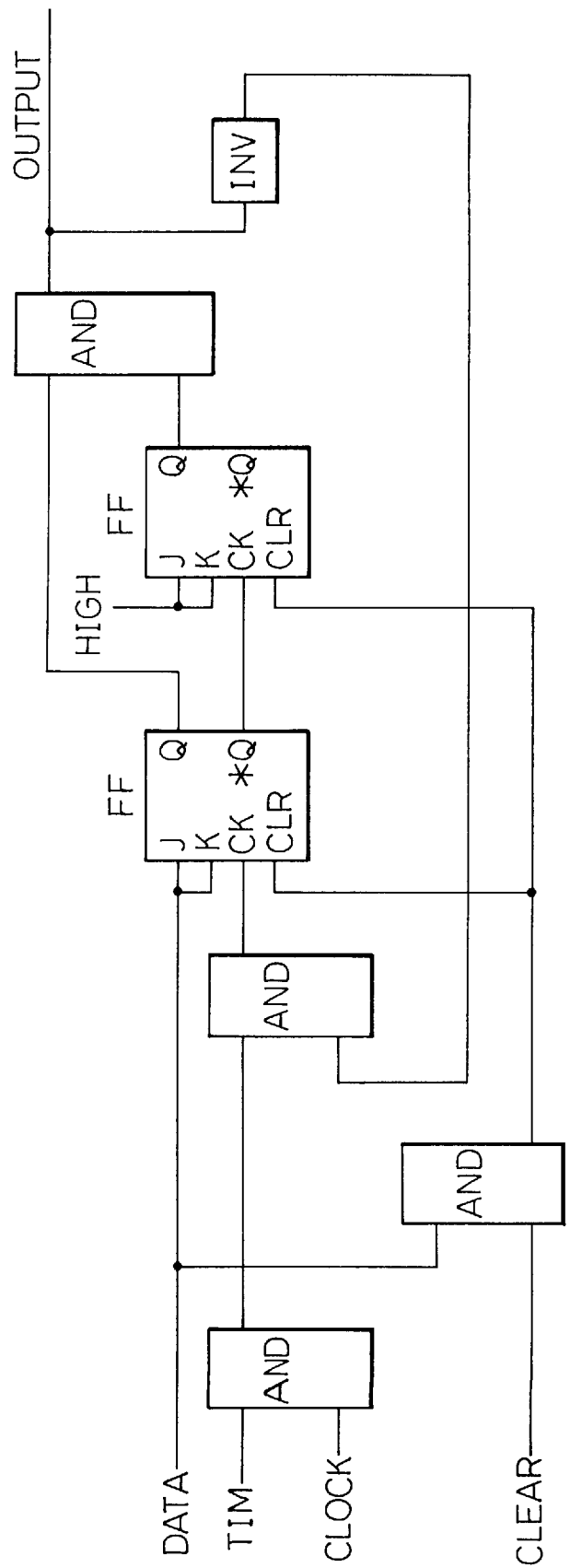
FIG. 17 is a circuit diagram illustrating the constitution of a third example of a dead time generating circuit.

FIG. 17 illustrates the constitution of a third example of the dead time generating circuit. In FIG. 17, reference numerals FF designate the flip-flops of the JK type. This circuit continues sampling according to clock signals for generating input data DATA from input signals CLOCK and TIM. When all results of three or more consecutive sampling operations represent a high level High, the level of an output OUTPUT thereof is set at a high level High. The input of clock signals is stopped in response to a signal obtained by inverting the output signals. Thus, the output signals OUTPUT are latched in such a way as to have a high level High. If the input data DATA represents a low level LOW, all flip-flops FF of the JK type are cleared. The number of counts is reset.

If the input clear data CLEAR is once set at a low level Low, the flip-flops FF of the JK type are cleared. When the level of the output data OUTPUT is changed to a low level Low, the input clock signals CK are enabled. If the level of the input clear data CLEAR is returned to a high level High, the state of the circuit is returned to a state in which the sampling of the input data DATA is repeated.

Figure 18A:
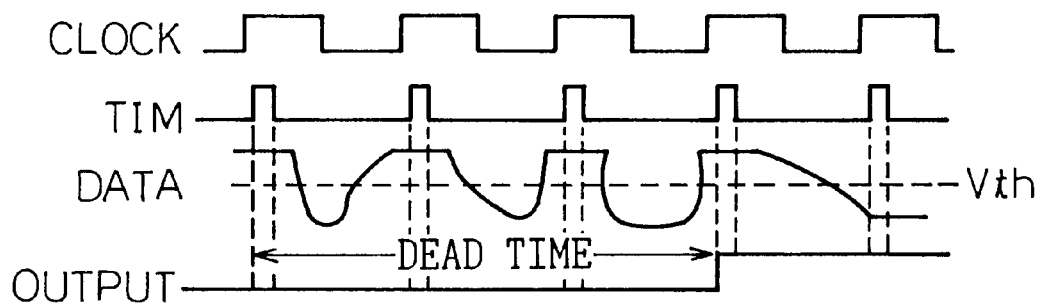
FIGS. 18A and 18B are timing charts illustrating the relation between the dead time and the output waveform of the dead time generating circuit.
Figure 18B:
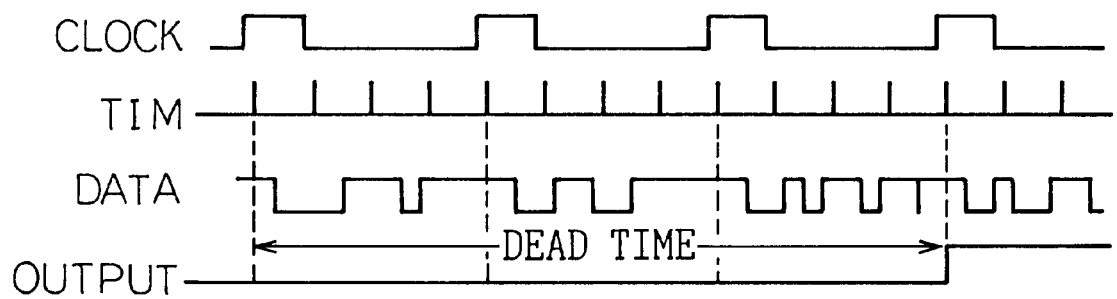

FIGS. 18A and 18B each illustrate the relation between the dead time generated by the dead time generating circuit and the waveform of a signal OUT outputted therefrom. Incidentally, reference characters DATA and TIM designate an input signal, and a setting signal for setting a time period, in which the input signal is enabled (namely, the time when the level of the setting signal has a high level), respectively. Reference character CLOCK designates a basic clock signal for generating a dead time (4 clock slots are is the dead time in the aforementioned example of the circuit). Reference character CLEAR denotes a clearing signal. Further, reference character OUTPUT represents an output signal, whose signal level is a high if the duration of an input signal is 4 clock slots. FIG. 18A illustrates an example, in which the signals CLOCK and TIM have the same period. FIG. 18B illustrates another example, in which the period of the signal CLOCK is 4 times the period of the signal TIM.

Figure 19:
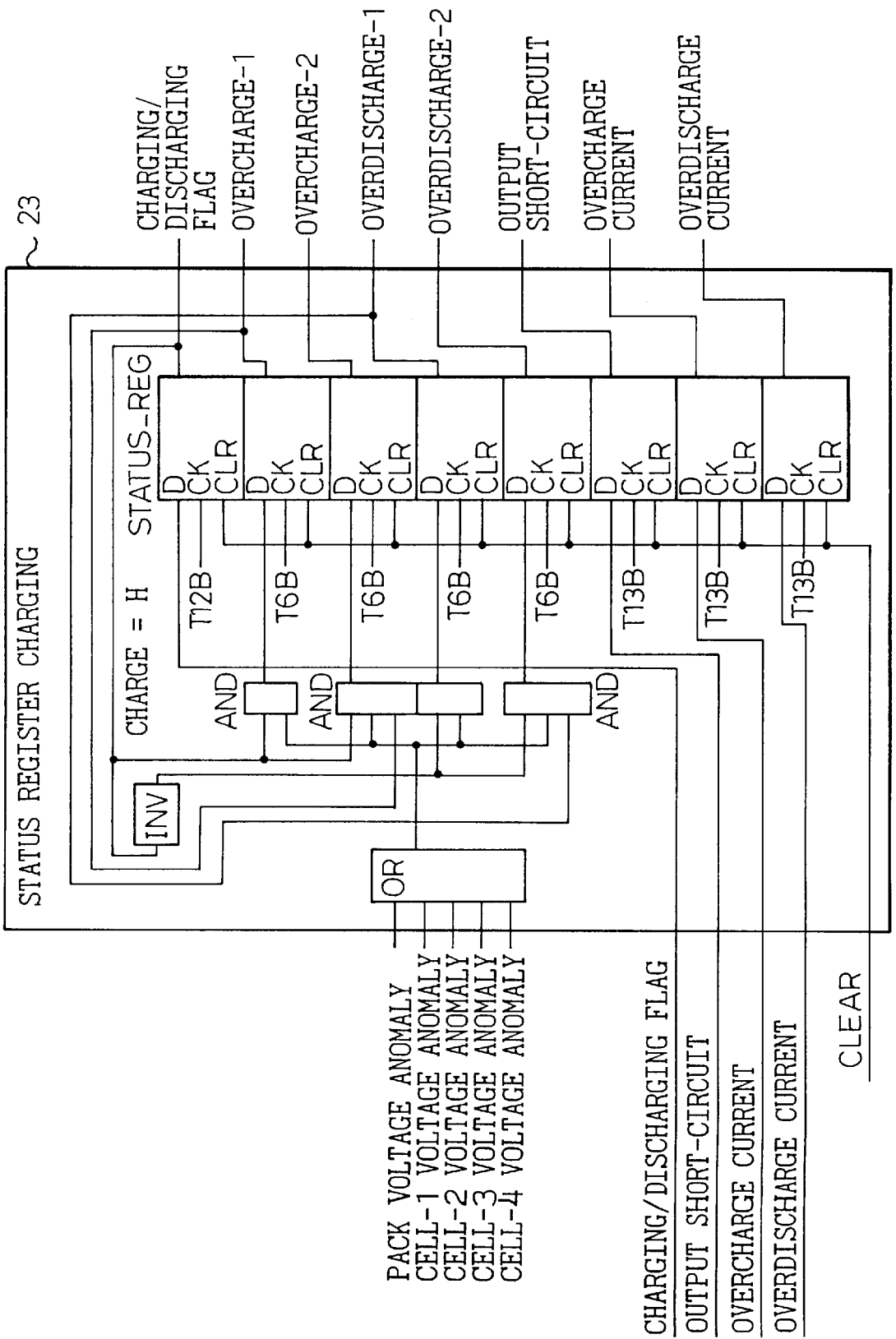
FIG. 19 is a circuit diagram illustrating the constitution of a status register circuit.

FIG. 19 illustrates the constitution of an example of the status register circuit 23 which receives the following signals from the portions thereof, that is, a pack voltage anomaly signal, a CELL-1 voltage anomaly signal, a CELL-2 voltage anomaly signal, a CELL-3 voltage anomaly signal, a CELL-4 voltage anomaly signal, a charging/discharging flag, an output short-circuit signal, an overcharge current signal, an overdischarge current signal, and the clearing signal CLEAR outputted at the time of turning on the power supply, and various kinds of output timing signals Ti. In response to these signals, the statuses of signals respectively representing the charging/discharging flag, overcharge-1 overcharge-2, overdischarge-1, overdischarge-2, output-short-circuit, overcharge-current, and overdischarge-current are held in the register composed of the flip-flops of the D-type STATUS_REG.

Figure 20:
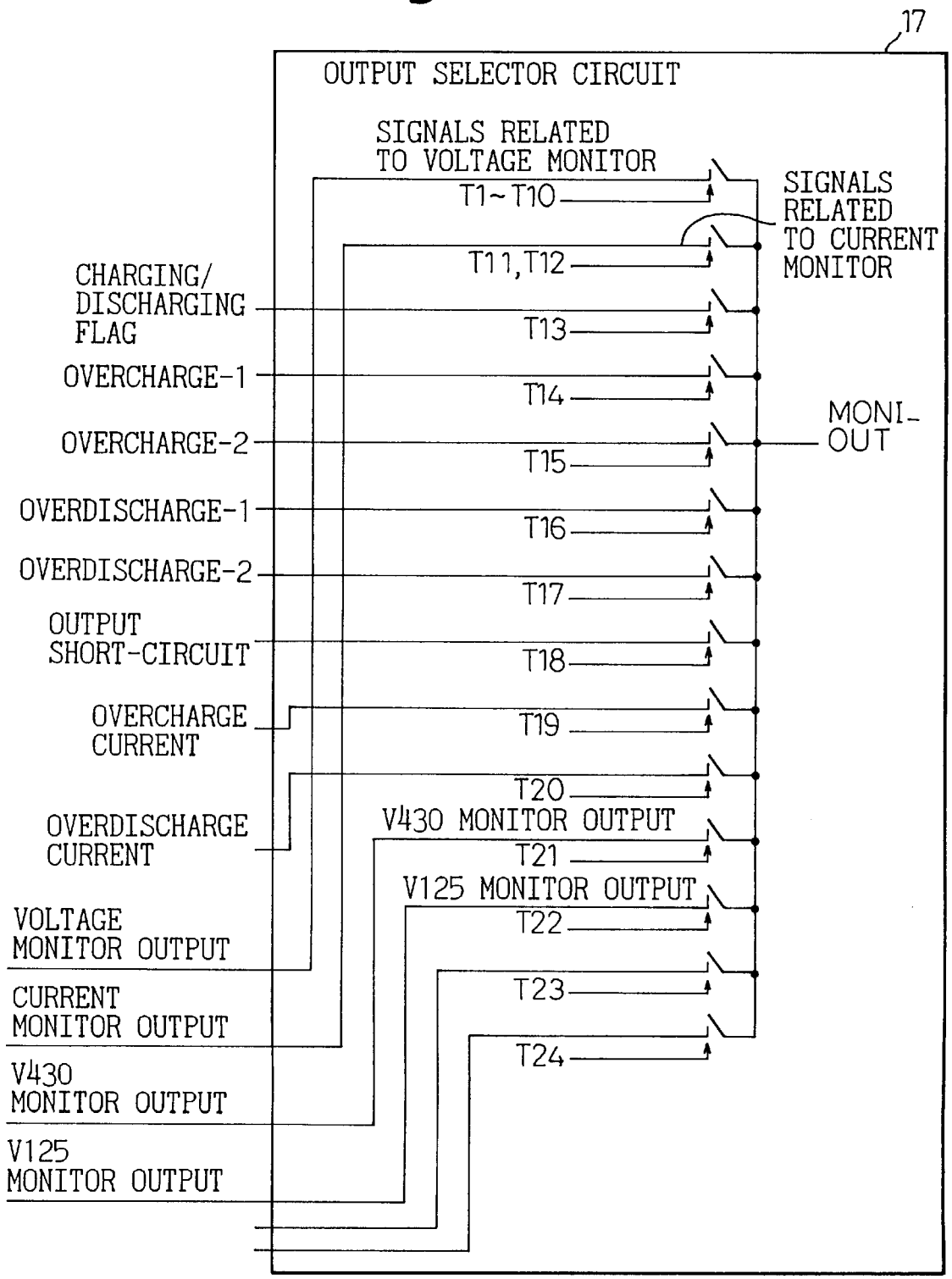
FIG. 20 is a circuit diagram illustrating the constitution of an output selector circuit.
Figure 21:
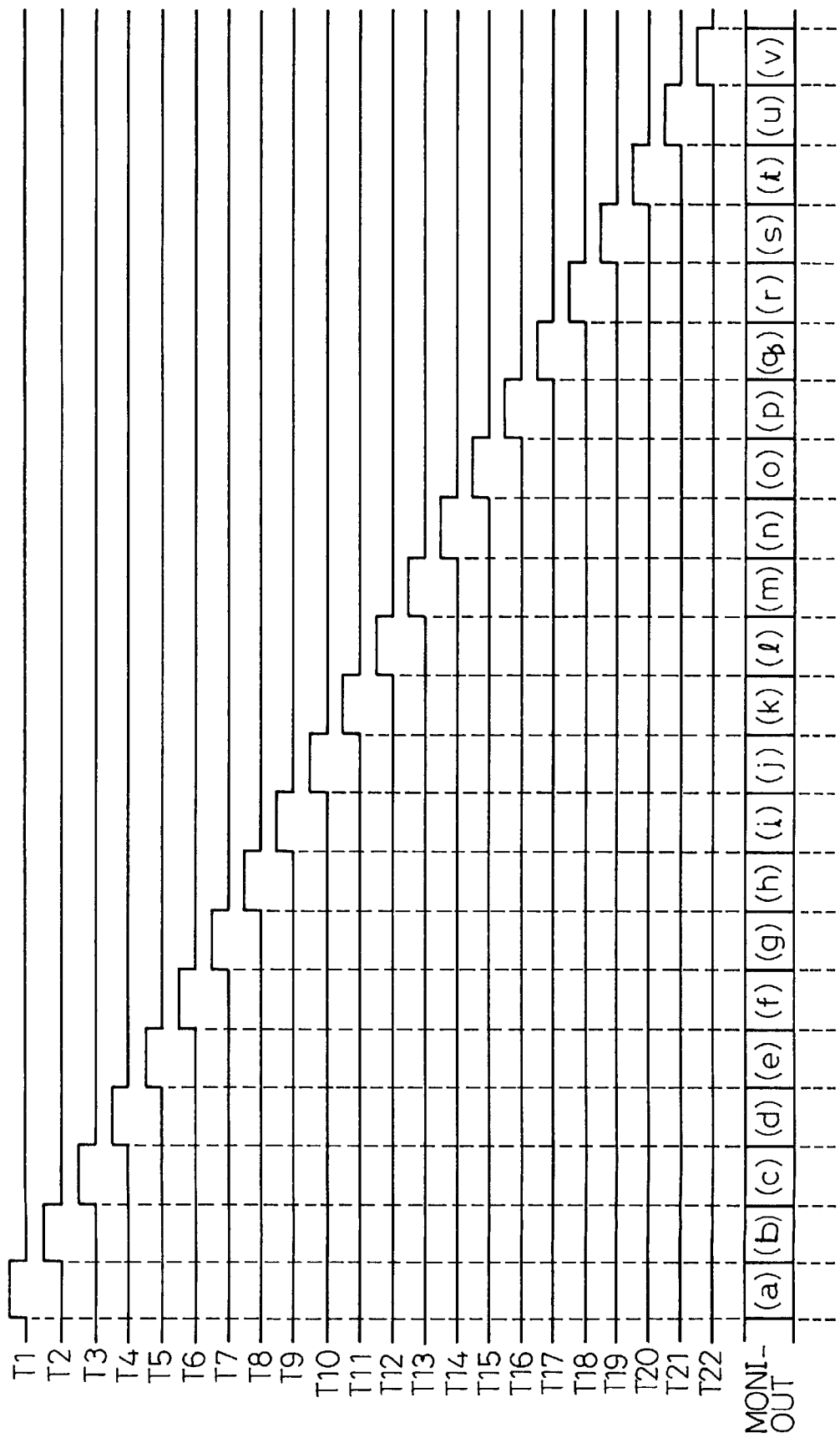
FIG. 21 is a timing chart illustrating out timing of the output selector circuit.

FIG. 20 illustrates the constitution of an example of an output selector circuit 17. FIG. 21 illustrates an example of the output timing of the output selector circuit 17. The output selector circuit 17 receives a status signal from the status register circuit 23. Moreover, the output selector circuit 17 receives a voltage monitor output signal, a current monitor output signal, a V430 (namely, one of the reference voltages) monitor output signal, and a V125 monitor output signal. Furthermore, the output selector circuit 17 outputs a monitor data signal and a status signal to a signal line MONI_OUT, which is used in a time division multiplex manner, in response to timing signals T1 to T22. The signal line MONI_OUT is connected to a digital input port and an ADC port of the MCU circuit 18 of the management circuit portion 5, as will be described later.

Figure 22:
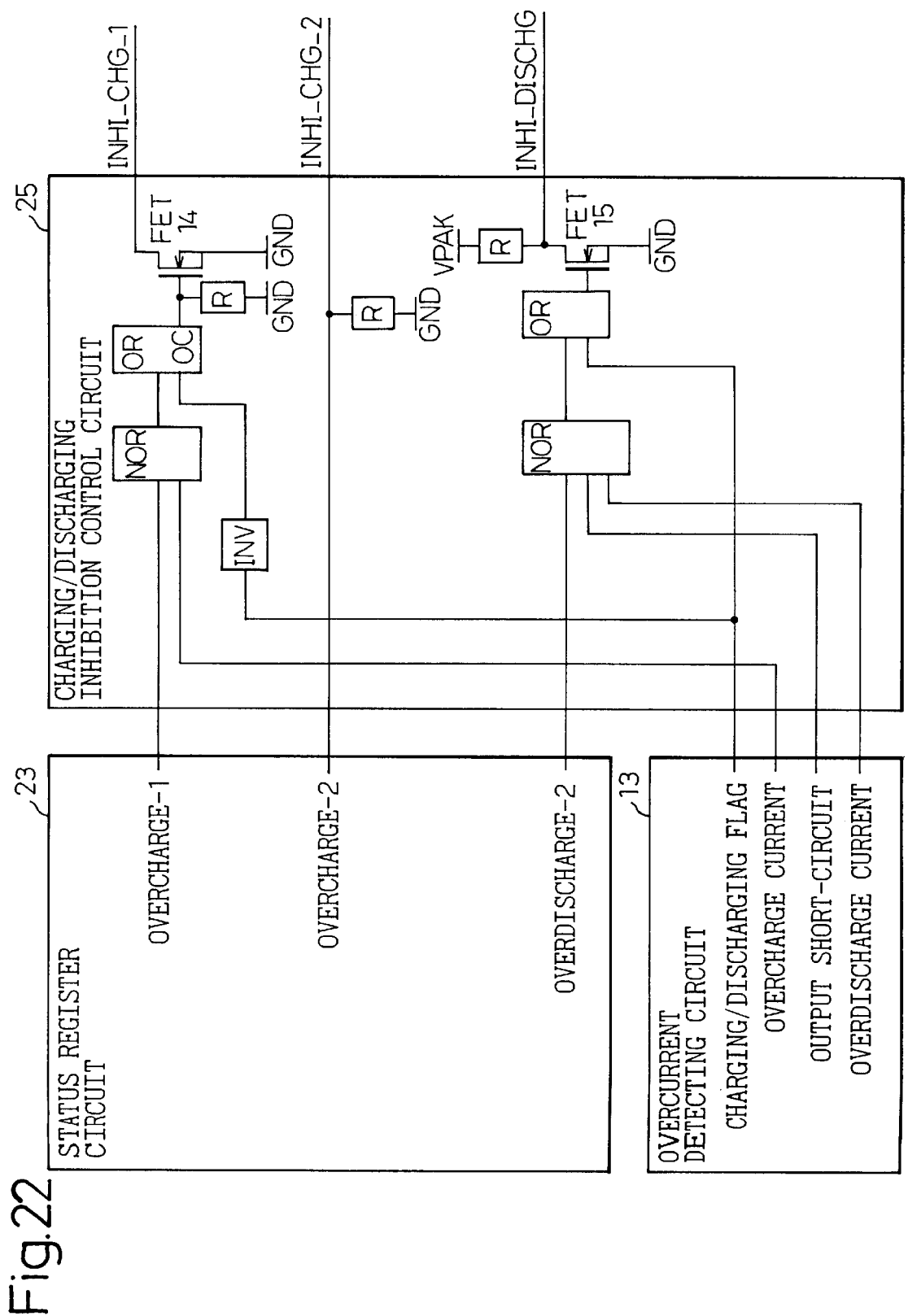
FIG. 22 is a circuit diagram illustrating the constitution of a charging/discharging inhibition control circuit.

As shown in FIG. 21, the signals flowing through the signal line MONI_OUT are as follows:

(a) T1: a pack voltage monitor signal (b) T2: a CELL-1 voltage monitor signal (c) T3: a CELL-2 voltage monitor signal (d) T4: a CELL-3 voltage monitor signal (e) T5: a CELL-4 voltage monitor signal (f) T6: a calibration output signal of the pack voltage monitoring circuit (g) T7: a calibration output signal of the CELL-1 voltage monitoring circuit (h) T8: a calibration output signal of the CELL-2 voltage monitoring circuit (i) T9: a calibration output signal of the CELL-3 voltage monitoring circuit (j) T10: a calibration output signal of the CELL-4 voltage monitoring circuit (k) T11: a pack current monitor signal (l) T12: a pack current calibration output (m) T13: a charging/discharging flag signal (n) T14: an overcharge-1 status signal (o) T15: an overcharge-2 status signal (p) T16: an overdischarge-1 status signal (q) T17: an overdischarge-2 status signal (r) T18: an output short-circuit status signal (s) T19: an overcharge current status signal (t) T20: an overdischarge current status signal (u) T21: a V430 monitor output signal (v) T22: a V125 monitor output signal FIG. 22 illustrates the constitution of an example of the charging/discharging inhibition control circuit 25. In this figure, reference characters FET14 and FET 15 designate field effect transistors. This charging/discharging inhibition control circuit 25 is adapted to receive an overcharge-1 status signal, an overcharge-2 status signal, and an overdischarge-2 status signal from the status register circuit 23. Further, this charging/discharging inhibition control circuit 25 is adapted to receive an overcharging/overdischarging flag signal, an overcharge current signal, an output short-circuit signal, and an overdischarge current signal from the overcurrent detecting circuit 13. Moreover, this charging/discharging inhibition control circuit 25 is adapted to output a first charging inhibition control signal INHI_CHG_1, a second charging inhibition control signal INHI_CHG_2, and a discharging inhibition control signal INHI_DISCHG.

FIG. 23 illustrates the conditions for a control output by this charging/discharging inhibition control circuit 25. The first charging inhibition control signal INHI_CHG_1 is outputted therefrom if an overcharge OVERCHARGE-1 is detected during the charging of the battery, or if an overcharge current is detected during the charging of the battery. The second charging inhibition control signal INHI_CHG_2 is outputted therefrom, regardless of the charging/discharging flag, when an overcharge OVERCHARGE-1 is detected. The discharging inhibition control signal INHI_DISCHG is outputted therefrom when an overcharge OVERCHARGE-2 is detected during the charging, or when an output short-circuit is detected, or when an overdischarge current is detected.

Figure 24:
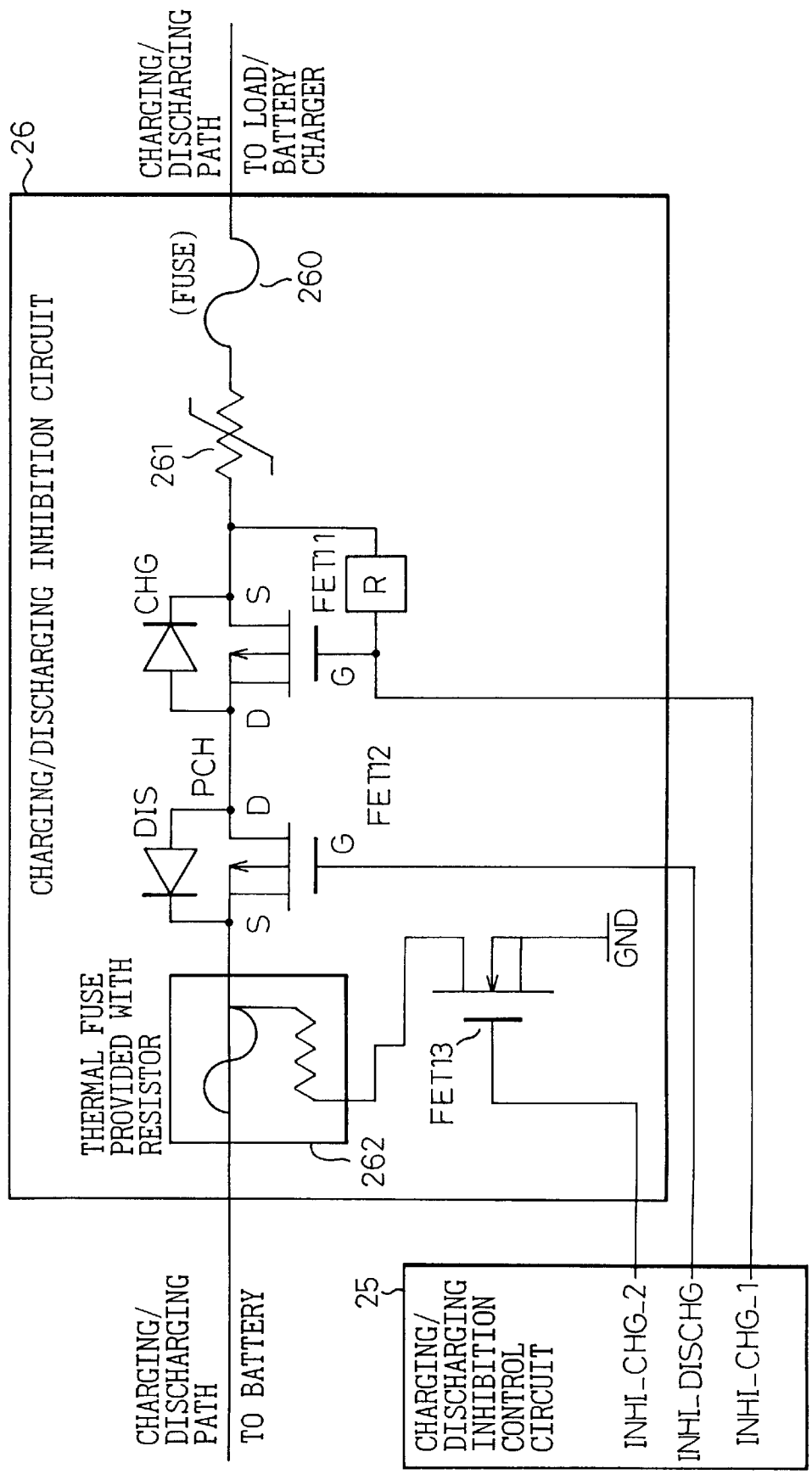
FIG. 24 is a circuit diagram illustrating the constitution of a charging/discharging inhibition circuit.

FIG. 24 illustrates the constitution of an example of the charging/discharging inhibition circuit 26. This charging/discharging inhibition circuit 26 is inserted in the charging/discharging path provided between the battery 3 and the main unit 2 or between the battery 3 and a battery charger. In this figure, reference characters FET11 to FET13 designate field effect transistors. Reference numerals 260, 261, and 262 denote a fuse, a polyswitch, and a thermal fuse provided with a resistor, respectively.

When the level of the first charging inhibition control signal INHI_CHG_1 outputted from the charging/discharging inhibition control circuit 25 is a high level, the FET 11 is turned off, so that the charging is stopped. Further, when the level of the second charging inhibition control signal INHI_CHG_2 is a high level, the FET 13 is turned on, so that an electric current flows through the resistor provided in the thermal fuse 262 having the resistor. Then, the fuse is blown, so that the charging is stopped. When the level of the charging inhibition control signal INHI_DISCHG is a high level, the FET 12 is turned off, so that the discharging is stopped.

Figure 25:
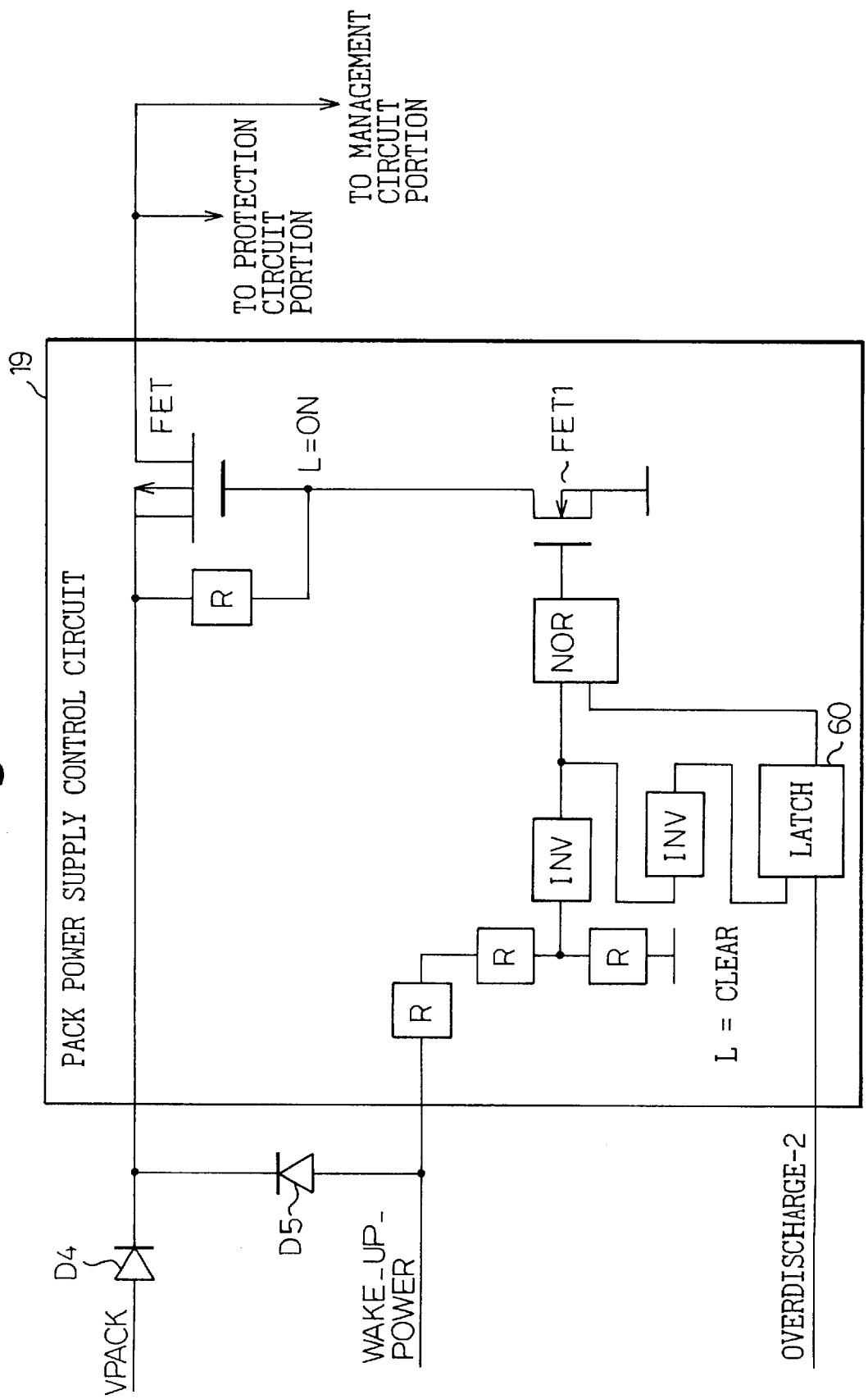
FIG. 25 is a circuit diagram illustrating the constitution of a pack power supply control circuit.
Figure 26:
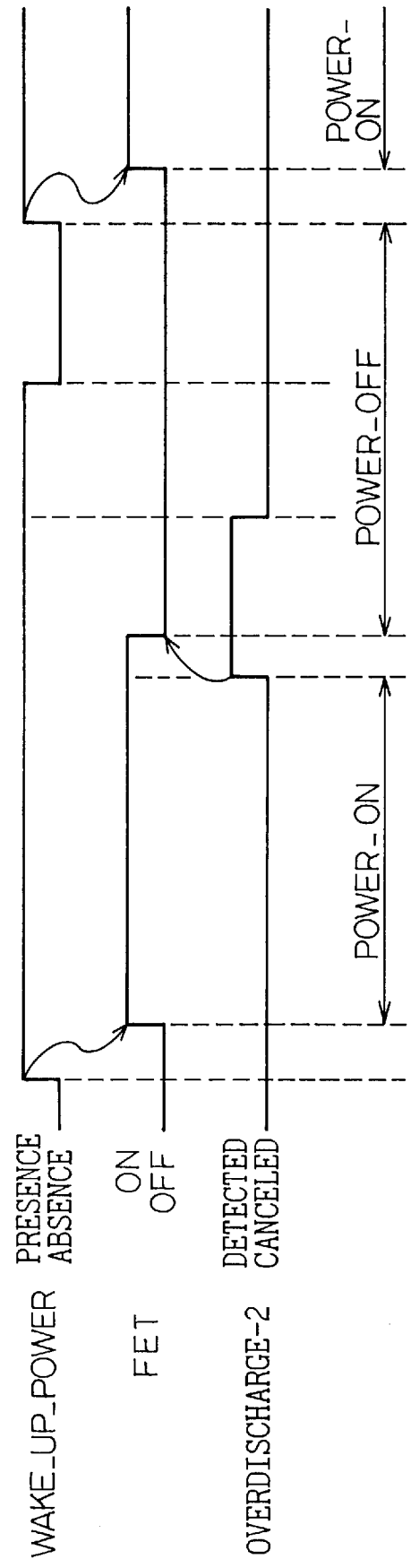
FIG. 26 is a timing chart illustrating a power supply control sequence performed by the pack power supply control circuit.

FIG. 25 illustrates the constitution of an example of the pack power supply control circuit 19. FIG. 26 illustrates a power supply control sequence performed by this control circuit 19. When a voltage is applied to the WAKE_UP_POWER terminal, the FET provided on the power supply circuit is turned on. Electric power supplied from the battery 3 or electric power for the precharge3, which is supplied from the WAKE_UP_POWER terminal , is fed to the protection circuit portion 4 and the management circuit portion 5 through the voltage regulator circuit 24. When the status of the overdischarge-2 is detected while the battery pack 1 is being used, such a state is held in a latch 60, and the FET 1 is turned on. Thus, the FET provided on the power supply path is turned off. Consequently, the supply of the electric power to the protection circuit portion 4 and the management circuit portion 5 is interrupted. If the application of the voltage to the WAKE_UP_POWER terminal after the status of the overdischarge-2 is canceled, the latch 60 is cleared. Thereafter, when a voltage is applied again to the WAKE_UP_POWER terminal, the FET is turned on. Thus, the supply of the electric power to the protection circuit portion 4 and the management circuit portion 5 is resumed.

Figure 27:
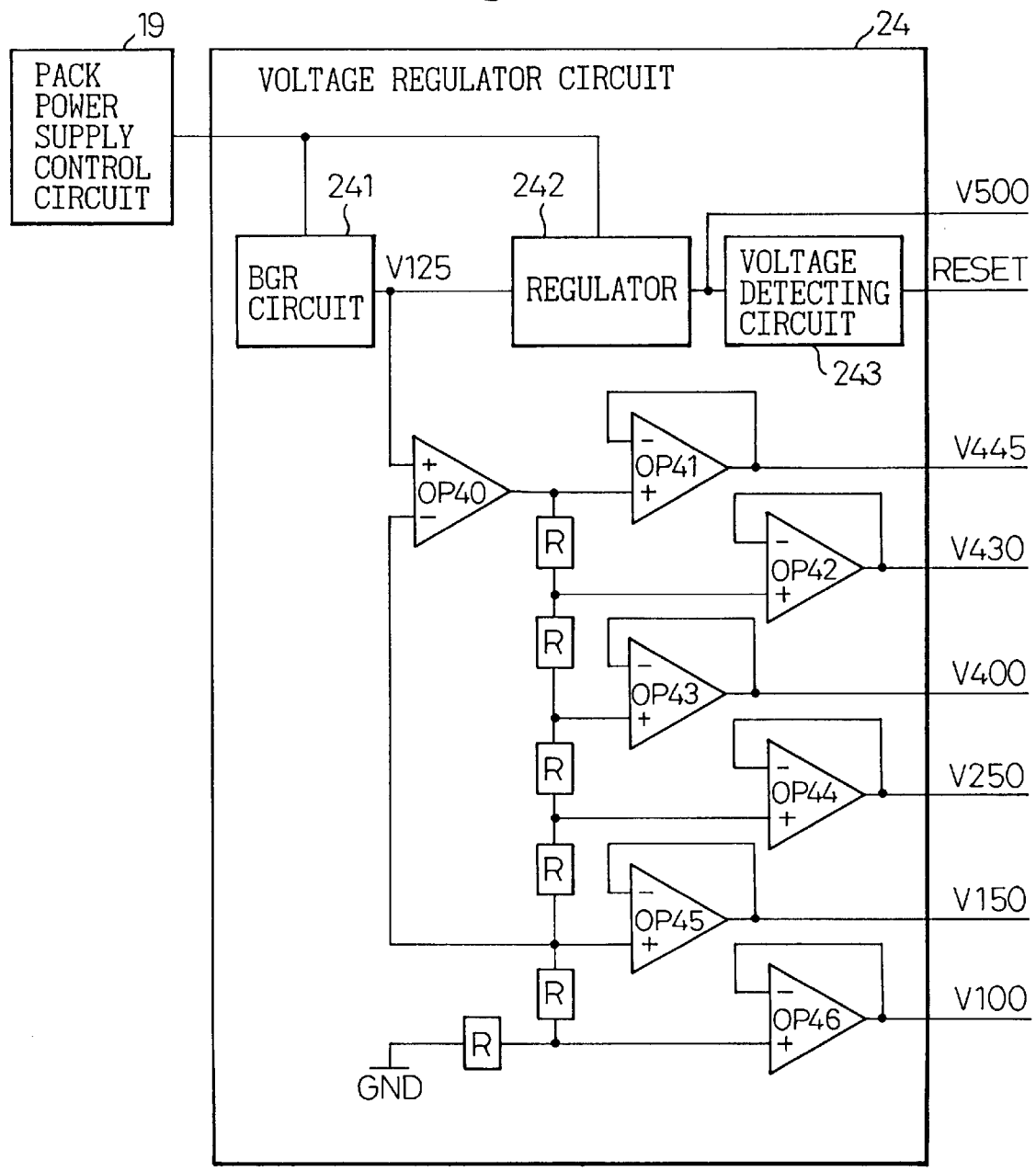
FIG. 27 is a circuit diagram illustrating the constitution of a voltage regulator circuit.

FIG. 27 illustrates the constitution of an example of a voltage regulator circuit 24. The voltage regulator circuit 24 is supplied with electric power from the pack power supply control circuit 19 and generates voltages V500, V445, V430, V400, V250, V150, and V100 respectively corresponding to voltages of 5 V, 4.45 V, 4.0 V, 2.5 V, 1.5 V, and 1.0 V by using a band gap reference (BGR) circuit 241, a regulator 242, and operational amplifiers OP40 to OP46, and generates reset signal RESET for the voltage detecting circuit.

Figure 28:
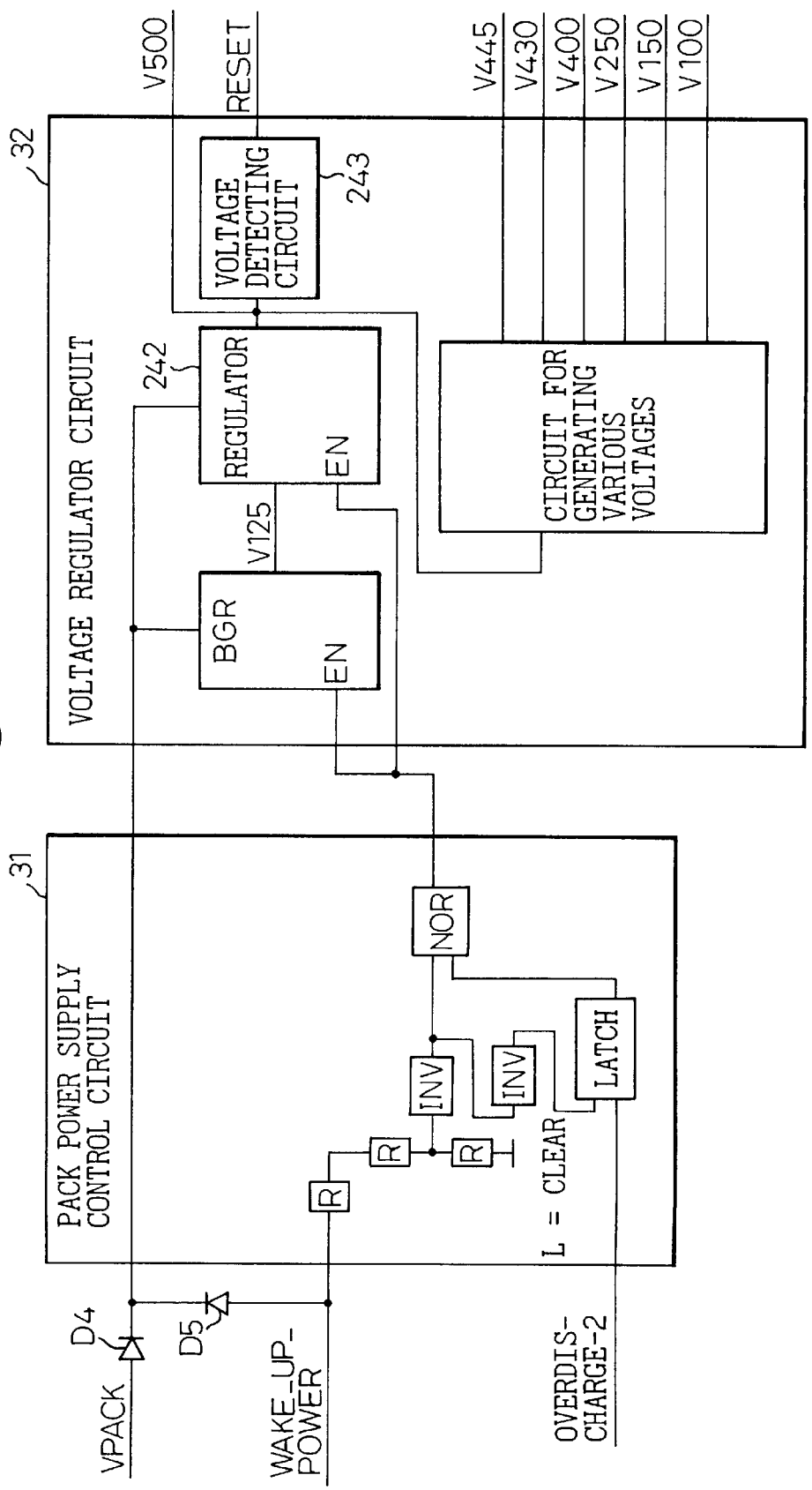
FIG. 28 is a circuit diagram illustrating the constitution of a second example of a voltage regulator circuit.
Figure 29:
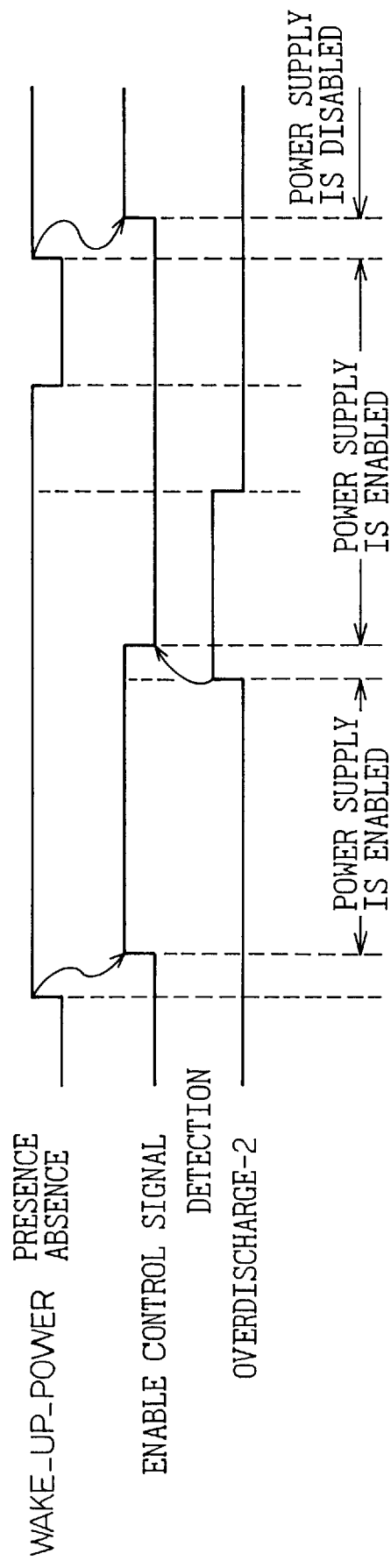
FIG. 29 is a timing chart illustrating a second example of a power supply control sequence performed by the pack power supply control circuit.

FIG. 28 illustrates the constitution of an example of each of the pack power supply control circuit and the voltage regulator circuit. FIG. 29 illustrates the power supply sequence performed by these circuits.

Although each of the examples of FIGS. 25 to 27 is adapted to turn off the power supply for the voltage regulator circuit 24 when the switch provided on the discharging path is turned off, this example illustrated in FIG. 28 is adapted to disable an operation of a voltage regulator circuit 32. The pack power control circuit 31 always supplies main electric power to the voltage regulator circuit 32. When an overdischarge-2 signal is inputted thereto, the circuit 31 outputs an enable control signal to the voltage regulator circuit 32. Then, in the voltage regulator circuit 32, a BGR circuit 241 and a regulator 242 stop working, so that an output of the voltage regulator circuit 32 is disabled.

Figure 30:
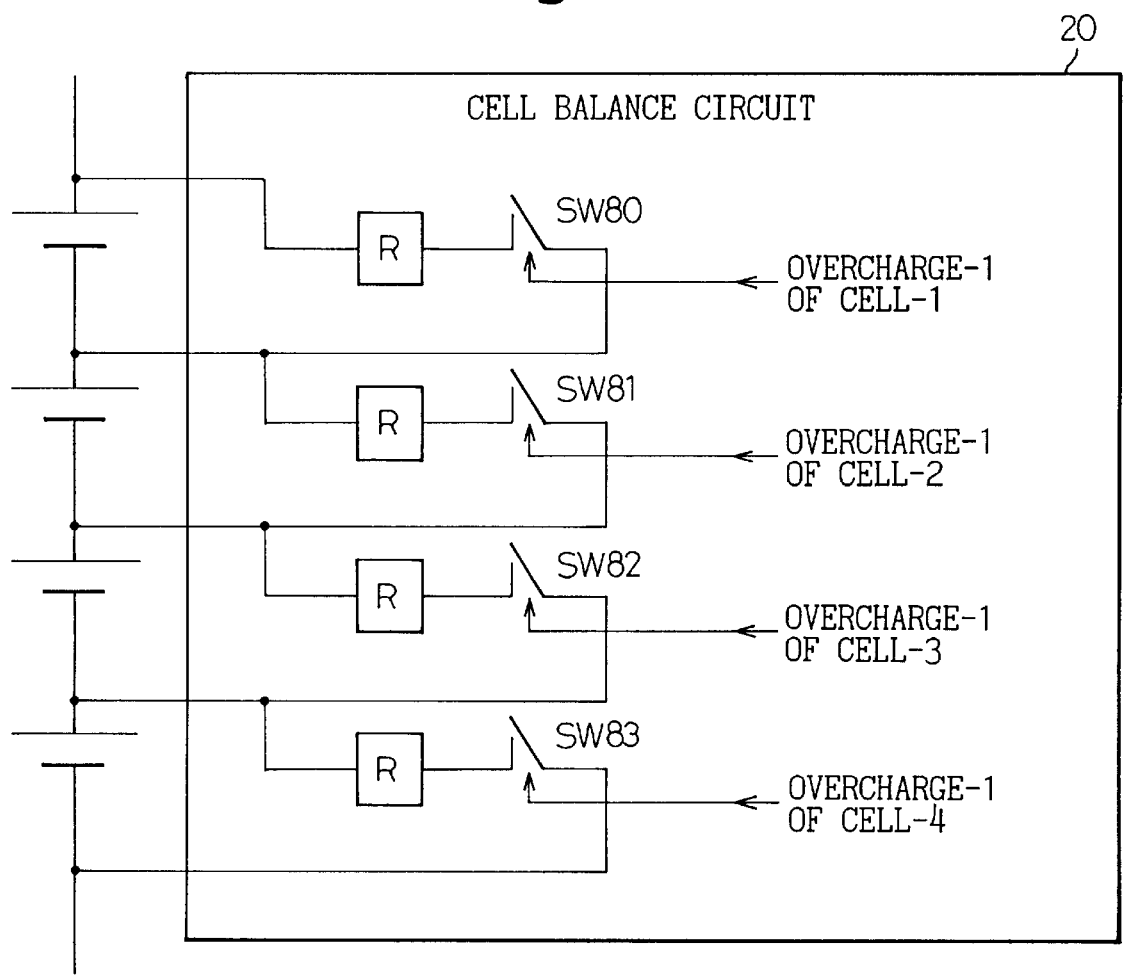
FIG. 30 is a circuit diagram illustrating the constitution of a cell balance circuit.

FIG. 30 illustrates the constitution of an example of a cell balance circuit 20. When each of the cells CELL-1, CELL-2, CELL-3, and CELL-4 is put into an overcharge-1 state, a corresponding one of switches SW80, SW81, SW82, and SW83 is switched to a conducting state and thus bypasses a charging current corresponding to the overcharged cell. Consequently, all the cells are charged in a well balanced state until all the cells are fully charged.

Figure 31:
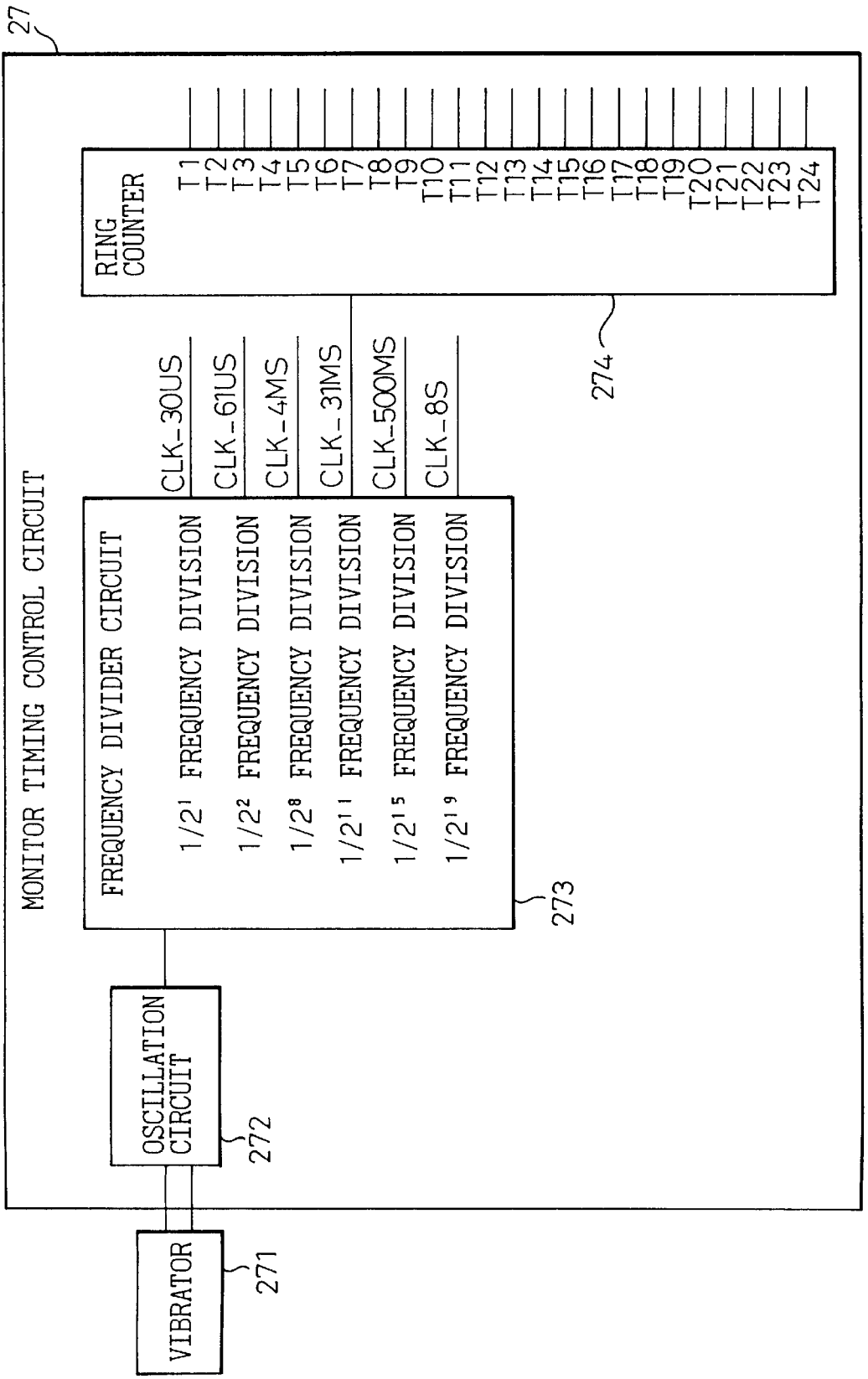
FIG. 31 is a circuit diagram illustrating a monitor timing control circuit.
Figure 32:
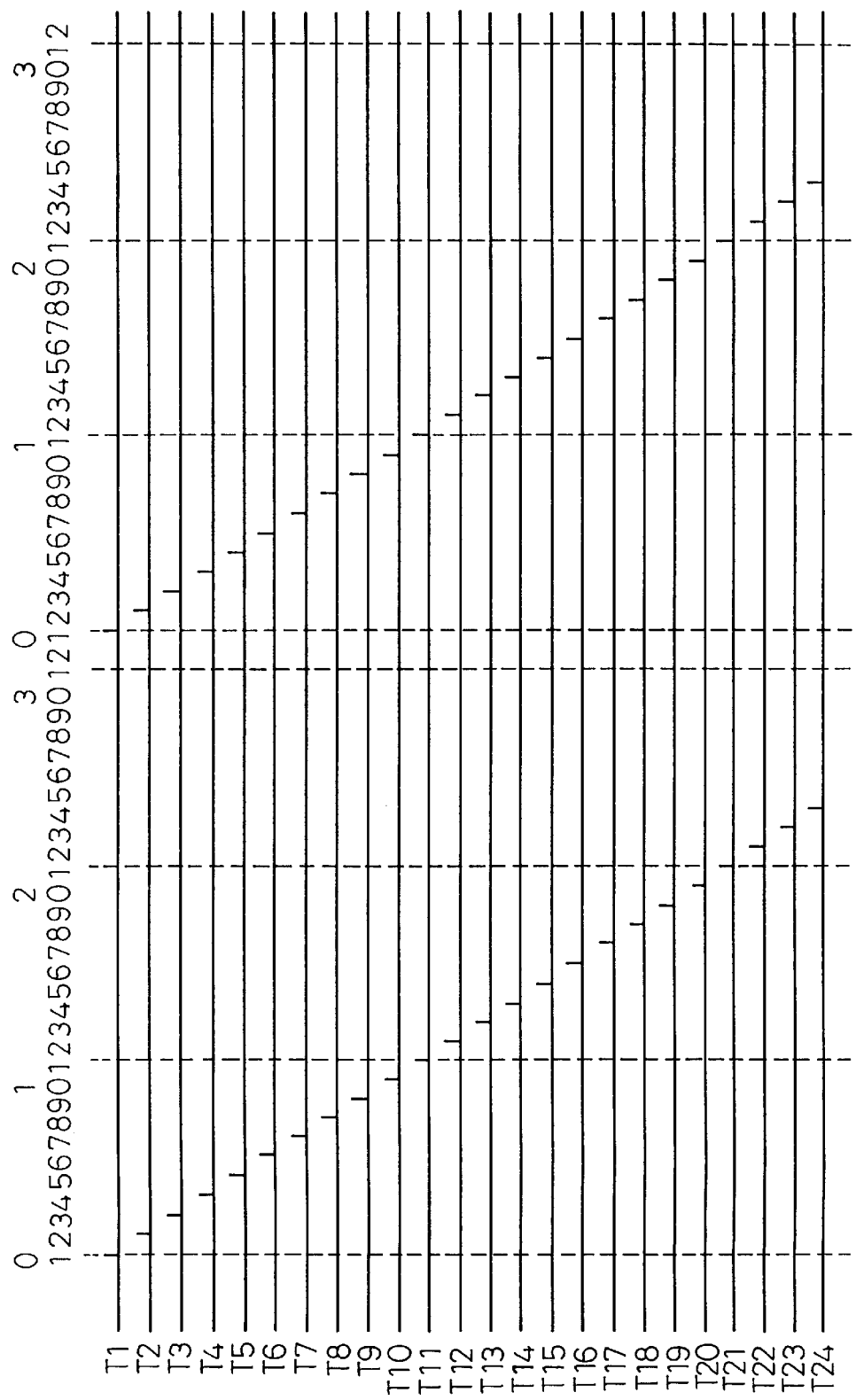
FIG. 32 is a timing chart illustrating an output signal outputted by the control circuit.

FIG. 31 illustrates the constitution of an example of a monitor timing control circuit 27. An oscillation circuit 272 is connected to a vibrator 271, such as a quartz oscillator, and outputs a signal that is oscillated at a period of 15.53 $\mu$s. A frequency divider circuit 273 receives an output signal of the oscillation circuit 272 and performs a $\frac{1}{2}^1$ frequency division, a $\frac{1}{2}^2$ frequency division, a $\frac{1}{2}^8$ frequency division, a $\frac{1}{2}^{11}$ frequency division, a $\frac{1}{2}^{15}$ frequency division, and a $\frac{1}{2}^{19}$ frequency division thereof, so that a clock signal CLK__30US, whose period is 30.5 $\mu$s, a clock signal CLK__61US, whose period is 61 $\mu$s, a clock signal CLK__4MS, whose period is 3.9 ms, a clock signal CLK__31MS, whose period is 3 ms, a clock signal CLK__61US, whose period is 61 $\mu$s, a clock signal CLK__500MS, whose period is 0.5 s, and a clock signal CLK__8S, whose period is 8 s, are generated. The clock signal CLK__31MS is then inputted to a ring counter 274 constituted by a hexadecimal ring counter. The ring counter 274 generates output timing signals T1 to T24 from this clock signal CLK__31MS. FIG. 31 is a timing chart illustrating an output timing signal generated by the ring counter 274. This signal is outputted from the control circuit 27 to each part of the protection circuit portion 4.

Overcharge Detecting Method

An overcharge detecting means having an overcharge detecting threshold value, which differs from a threshold value used in the conventional circuit, is added to the overcharge detecting circuit 15. Further, a protection means for interrupting the charging/discharging path is added to the overcurrent protection/overcharge protection circuit 14. That is, first and second overcharge detecting means are provided therein. The first overcharge detecting means and the second overcharge detecting means may operate either sequentially or completely independent of each other. Similarly as in the conventional circuit, the protection means to be connected to one of the detecting means turns off the switch inserted into the charging/discharging path to thereby protect the battery 3 from an overcharge. The protection means to be connected to the other detecting means inserts an element, such as a fuse provided with a heating resistor, into the charging/discharging path and protects the battery 3 from an overcharge by energizing the element when an overcharge is detected, and blowing the fuse.

The effects of this method will be described hereinbelow. While the charging of the battery is progressing, first, an overcharge is detected by the first overcharge detecting means. Then, the switch inserted in the charging/discharging path is turned off so as to protect the battery from an overcharge. However, if this path is not interrupted owing to a malfunction of the switch, so that the charging of the battery is not interrupted, and thus the discharging thereof is further progressed, the battery voltage rises still more. At that time, the second overcharge detecting means detects an overcharge and interrupts the charging/discharging path by energizing the heating resistor of the fuse and blowing the fuse.

If the first overcharge detecting means and the first protection means operate normally in this way, the charging/discharging operations are continuously repeated without operations of the second overcharge detecting means and the second protection means. Conversely, if the first overcharge detecting means and the first protection means do not operate normally, when the second overcharge detecting means and the second protection means then operate, the continuous charging/discharging of the battery cannot be achieved. In this case, it is necessary to study the causes of the abnormal operations of the first overcharge detecting means and the first protection means and take countermeasures and replace the fuse with new one.

Further, this method may be constituted so that the function of the second overcharge detecting means is enabled when the first overcharge detecting means detects an overcharge. According to this method, when the second overcharge detecting means is not used, the circuits of this portion are turned off (or disabled), so that the power consumption can be reduced. Even when the detecting threshold value employed by the first overcharge detecting means is set at a value higher than that of the second overcharge detecting means, no interference is caused between operations of both the overcharge detecting means.

Overdischarge Detecting Method

When the first overdischarge detecting means detects an overdischarge, this means causes the first protection means to work, and enables the second overdischarge detecting means. As a result, if the discharge is further progressed, the second overdischarge detecting means detects the overdischarge and then causes the first overdischarge detecting means to work. Moreover, the power supply for the second overdischarge detecting means is turned off (or disabled) until the overdischarge is detected by the first overdischarge detecting means.

Further, if the method is adapted so that the first and second overdischarge detecting means function completely independent of each other, the second discharge detecting means is allowed to operate without being affected by anomaly in the operation of the first overdischarge detecting means.

One of the overdischarge detecting means monitors the terminal voltage of each of the cells of the battery 3 and detects an overdischarge when the terminal voltages of all the cells are not more than a predetermined threshold value. The other of the overdischarge detecting means monitors the terminal voltage (namely, the pack voltage) of the entire battery 3 and detects an overdischarge when the terminal voltage of the entire battery 3 is not more than a predetermined threshold value. In the case of the overdischarged state, which is detected by monitoring the terminal voltage of each of the cells of the battery 3, the switch inserted in the charging/discharging path is still in the on-state, and only the output of an overdischarge alarm signal is performed. The system of the main unit forcefully terminates important processing, and switches the battery to another one or prompts a user to connect an AC adapter thereto.

In the case of the overdischarge detected by monitoring the pack voltage, the switch inserted in the charging/discharging path is turned off, so that the discharging is forcefully stopped. Incidentally, even in this case, after the detection of the overdischarge, the supply of electric power is continued for a predetermined time so as to ensure a stable operation of the system. Thereafter, the switch is turned off. During this time, the system can urgently save data.

The detection threshold value for detecting an overdischarge by the overdischarge detecting means is set at a low value close to the lowest operating voltage of the protection circuit portion 4. When an overdischarge is detected by monitoring the pack voltage, the charging/discharging path is interrupted. Moreover, all the power supplied for the protection circuit portion 4 and the management circuit portion 5 in the battery pack 1 are turned off (or disabled) to minimize the self discharge.

Although an alarm is outputted by detecting an overdischarge from the terminal voltage of each of the cells of the battery 3, the terminal voltage of each of the cells is posted to the system of the main unit through the management circuit portion 5. When each of the values of such terminal voltages is less than a predetermined value, the system controls the cells by using the system power supply control portion 6 so as to prevent the cells from commencing an irreversible chemical reaction and receiving electric power from this battery pack 1.

The effects of this method will be described hereunder. As the discharge progresses, first, an overdischarge is detected by the first overdischarge detecting means (in this example, an overdischarge is detected when the terminal voltage of each of the cells is less than a predetermined value). At that time, an overdischarge state alarm is outputted. When the discharge progresses still further in this state, the pack voltage drops still more. Then, the second overdischarge detecting means detects an overdischarge. Subsequently, the second overdischarge detecting means turns off the switch inserted in the charging/discharging path to thereby interrupt this path.

Thus, the first overdischarge detecting means prompts the system to urgently save the data and switch the current power supply to a new one, so that the power consumption of the overdischarged battery 3. If the response of the system is slow, the second overdischarge detecting means detects a drop of the pack voltage and posts such a state to the system. After a predetermined time elapses, the second overdischarge detecting means forcefully interrupts the charging/discharging path to thereby prevent the battery pack 1 from being put into an irreversible overdischarged state.

In the case that the first and second overdischarge detecting means are caused to function completely independent of each other, the second overdischarge detecting means may function in the state in which no alarm is outputted by the first overdischarge detecting means. However, the discharge is continued in a predetermined time period after the second overdischarge detecting means detects the overdischarge. Thus, the system of the main unit can urgently save the data and perform a necessary minimum operation within such a time period.

Further, this method may be constituted so that the function of the second overdischarge detecting means is enabled when the first overdischarge detecting means detects an overdischarge. According to this method, when the second overdischarge detecting means is not used, the circuits of this portion is turned off (or disabled), so that the power consumption can be reduced.

The threshold value used by the first overdischarge detecting means is set for the cell voltage of each of the cells. Differently from this, the threshold value used by the second overdischarge detecting means is set for the pack voltage, namely, the terminal voltage of the entire battery. That is, the voltages, for which these threshold values are set, differ from each other. Thus, there is caused no interference between operations of both the overdischarge detecting means.

The energy stored in the battery 3 can be consumed as much as possible by lowering the threshold value employed by the overdischarge detecting means for detecting the overdischarge by monitoring the pack voltage. When an overdischarge is detected by monitoring the pack voltage, the charging/discharging path is interrupted. Moreover, the power supplies for all the circuits, such as the protection circuit portion 4 and the management circuit portion 5 of the battery 1 are turned off (or disabled) so as to reduce the self discharge as much as possible. Consequently, an occurrence of a failure, which progresses the overdischarging of the battery 3 and causes an irreversible reaction and prevents the recharging thereof, can be avoided.

The terminal voltage of each of the cells of the battery 3 and the pack voltage are periodically monitored and posted to the system of the main unit 2 through the MCU circuit 18 of the management circuit portion 5. The system refers to the values of such monitored voltages and performs necessary protection operations.

According to this embodiment, the doubling of each of the overcharging detecting circuit and the protection circuit is achieved. Thus, even when a malfunction occurs in each of the first overcharge detecting means and the first protection means and these means do not operate normally, the second overcharge detecting means and the second protection means function and interrupt the charging/discharging path, so that an overcharge is prevented. Therefore, a more highly reliable protection function can be realized. Further, an unused circuit is put into an off-state (or disabled) and the power consumption is lowered by causing the first and second overcharge detecting means to sequentially operate. Furthermore, a more highly reliable protection function can be realized by causing the first overcharge detecting/protection means to operate completely independent of the second protection means Further, the first overdischarge detecting means, the first protection means, the second overdischarge detecting means, and the second protection means are provided in the battery pack. The first overdischarge detecting means and the first protection means outputs an overdischarge alarm when an overdischarge is detected by monitoring the cell voltages. Thus, the system of the main unit can reliably save the data. Moreover, the energy stored in each of the cells can be almost fully utilized within a range in which the battery is rechargeable.

Further, the charging/discharging path is interrupted when an overdischarge is detected by monitoring the pack voltage. Thus, the energy stored in the entire battery pack can be almost fully utilized within a range in which the battery is rechargeable. In the case that the charging/discharging path is interrupted when an overdischarge is detected by monitoring the pack voltage, the system of the main unit can save necessary data by allowing a discharge for a predetermined time period. Moreover, the power supplies for all the internal circuits of the pack are turned off after an overdischarge is detected by monitoring the pack voltage. Thus, a failure, which causes the overdischarging of the battery 3 and causes an irreversible reaction and prevents the recharging thereof, can be avoided.

An overdischarge is detected by using two systems (or different kinds of threshold values). Thus, the reliability of the detecting systems is enhanced. Furthermore, the detection of an overdischarge by using the pack voltage and the detection of an overdischarge by using the cell voltages are simultaneously utilized. The values of the monitored voltages are posted to the system of the main unit. Therefore, when the voltage of one cell drops abnormally, the system controls the circuit in such a way as to be prevented from being supplied with electric power from this battery pack. Consequently, in a state in which the supply of electric power is continued while the pack voltage is normal and the cell voltage is abnormal and an alarm is outputted, each of the cells having an abnormal cell voltage can be prevented from causing an irreversible reaction.

At both times of charging and discharging, a current monitor output voltage, which is proportional to the absolute value of the current, is measured. Thus, at each charge/discharge, a full-scale monitor output can be utilized. In the case that a low current should be measured, for example, when the system of the main unit is in a standby state or a sleep state, the current can be accurately monitored. It can be accurately determined from the discrimination between the charging direction and the discharging direction of flow of a pack current whether or not the battery is being charged or discharged. When the absolute values of the currents respectively flowing during a charging operation and during a discharging operation are equal to each other, the same monitor value is outputted. Thus, the dynamic range of the A/D converter can be fully utilized at both times of charging and discharging. Consequently, quantization errors can be decreased. Even when the current is minute, for instance, when the state where the main unit is changed to the standby state, the discharging state is maintained by the function of the dead time generating circuit. Consequently, even in a region in which the current is minute, an erroneous operation due to noises does not occur. This prevents an occurrence of chattering.

Figure 33:
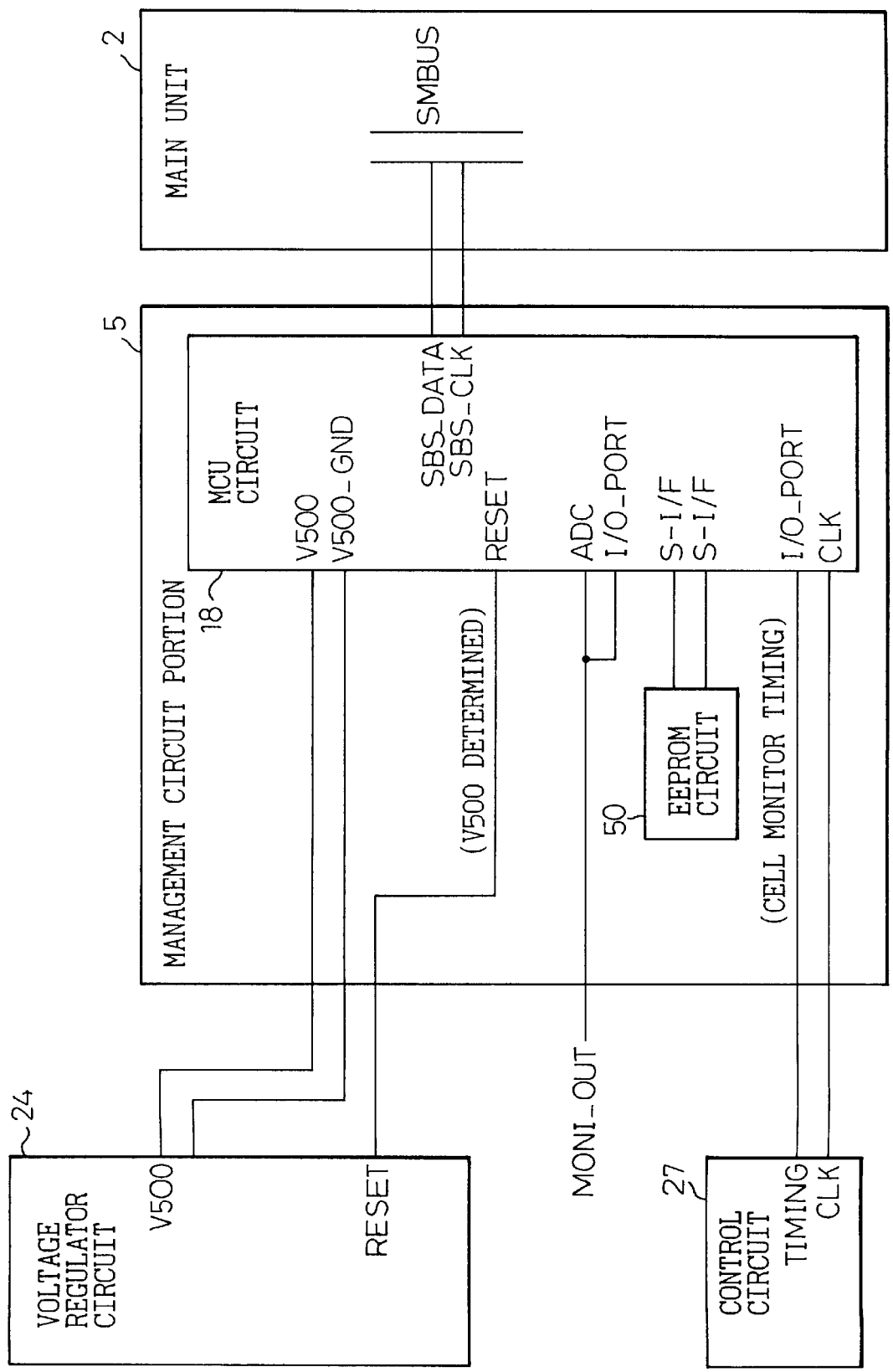
FIG. 33 is a block diagram illustrating the constitution of a management circuit portion.

FIG. 33 illustrates the constitution of an example of the management circuit portion 5. The management circuit portion 5 comprises the MCU circuit 18, which is constituted by a microprocessor, and the EEPROM circuit 50 storing a microprogram.

The MCU circuit 18 receives a signal having a level corresponding to a power supply voltage V500, which is 5V, and a reset signal RESET. Further, status and monitor data signals MONI_OUT outputted from the status register circuit 23 in the time division multiplex manner are inputted to both of an ADC port for analog signals, and an I/O port for digital signals. Further, the EEPROM circuit 50 is connected to an interface S-I/F of an internal bus of the MCU circuit 18. Furthermore, a cell monitor timing signal outputted from the control circuit 27 is inputted to the I/O port. Further, a clock signal CLK, whose frequency is 32.768 KHz (corresponding to a period of 30.5 $\mu s$) is inputted to the clock input terminal CLK.

The state of the battery pack 1 is posted from the MCU circuit 18 to a system bus SMBus of the main unit 2 by using a data signal terminal SBS_DATA and a clock terminal SBS_CLK.

For example, signals respectively representing the voltage monitor outputs of each of the cells of the battery 3, the voltage monitor output and current monitor output of the battery pack 1, the overcharge voltage detected state and overdischarged voltage detected state of each of the cells, the overdischarge voltage detected state, overcharge voltage detected state, and overdischarge current detected state of the battery pack, the calibration data (to be represented by analog signals) of each of the detecting circuits, and a reference voltage tuning data (to be represented by analog signals) are outputted from the protection circuit portion 4 to the management circuit portion 5 without increasing the number of input/output pins of the LSI. Thus, the output selector circuit 17 is provided in the protection circuit portion 4. These output signals arranged in a predetermined order and undergoing time division multiplexing are sent to the MCU circuit 18 of the management circuit portion 5. That is, the output signals are preliminarily allotted to predetermined time slots. Thus, a predetermined sequence of such signals is repeatedly outputted.

A timing or sequence start signal is sent thereto by using another pin of the LSI so as to determine the leading end of the sequence. The analog and digital signals are connected to the input ADC port for analog signals, and the input port for digital signals of the MCU circuit 18 by using the same signal line.

Furthermore, the status data and the monitor data are outputted from the protection circuit portion to the management circuit portion by being made to undergo the time division multiplexing. Thus, the LSI has only to have two pins respectively used for transmission of the output signals and for transmission of the sequence start signal. Consequently, the number of necessary pins of the LSI is reduced when the management circuit portion is constituted by the LSI. The circuit sends a fixed sequence of predetermined signals at uniform time intervals. Thus, the scale of the control circuit is decreased. Furthermore, the battery pack of the present invention can easily deal with the case that a necessary dead time is longer than one time slot to which each of the output signals is allotted.

As described above, the present invention provides a highly-safe battery pack suitable for a portable information terminal at low cost.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A battery pack having a chargeable and dischargeable battery and a protection monitoring circuit for performing operations in relation to charging and discharging of said battery, said battery pack comprising:
   an input terminal from which a power supply activating signal is inputted from an external circuit; and
   a pack power supply control portion for connecting electric power from said battery to said protection monitoring circuit when the power supply activating signal is inputted to said input terminal, and for interrupting supply of electric power to said protection monitoring circuit when no power supply activating circuit signal is inputted to said input terminal.

2. The battery pack according to claim 1, which further comprises a power supply output terminal, connected to said battery, for applying a signal representing a voltage outputted from said battery as the power supply activating signal through an external switch to said input terminal.

3. The battery pack according to claim 1 or 2, wherein said input terminal, from which the power supply activating signal is inputted, is connected to a power input portion for inputting electric power to said protection monitoring circuit, to thereby use electric power of a power supply activating signal, which is inputted to said input terminal, as electric power for a precharging control operation performed by said protection monitoring circuit.

4. A battery pack having a chargeable and dischargeable battery and a protection monitoring circuit for performing operations in relation to charging and discharging of said battery, said protection monitoring circuit comprising:
- a protection circuit portion having:
  - a detection circuit for detecting an overcurrent and/or an overcharge and an overdischarge; and
  - a protection circuit portion for protecting said battery from an overcurrent and/or an overcharge and an overdischarge; and
- a management circuit portion for posting a state of said battery to the exterior by firmware,
- wherein a signal is transmitted only in a direction from said protection circuit portion to said management circuit portion between said management circuit portion and said protection circuit portion.

5. A battery pack having a chargeable and dischargeable battery and a protection monitoring circuit for performing operations in relation to charging and discharging of said battery, said protection monitoring circuit comprising:
- a protection circuit portion having:
  - a detection circuit for detecting an overcurrent and/or an overcharge and an overdischarge; and
  - a protection circuit portion for protecting said battery from an overcurrent and/or an overcharge and an overdischarge,
- wherein said detection circuit comprises a circuit, provided with a detection dead time, for determining, when a detection state continues for a time period which is not less than a predetermined time, that said detection state is detected, and for outputting a detection signal.

6. A battery pack having a chargeable and dischargeable battery and a protection monitoring circuit for performing operations in relation to charging and discharging of said battery, said protection monitoring circuit comprising:
- a protection circuit portion having:
  - a detection circuit for detecting an overcurrent and/or an overcharge and an overdischarge; and
  - a protection circuit portion for protecting said battery from an overcurrent and/or an overcharge and an overdischarge;
- a management circuit portion for posting a state of said battery to the exterior by firmware; and
- a signal line for transmitting status data and monitor data from said protection circuit portion to said management circuit portion,
- wherein each of signals transmitted from said protection circuit portion to said management circuit portion is allotted to a predetermined time slot, and wherein said management circuit portion sends a predetermined sequence of the signals on a same one of said signal line.

7. The battery pack according to claim 6, which further comprises a signal line through on which a sequence start signal for definitely determining a leading end of the sequence.

8. The battery pack according to claim 6, wherein said signal line for transmitting status data and monitor data is connected to both of a port for inputting a digital signal, and a port for inputting an analog signal, which are provided in said management circuit portion.

9. A battery pack having a chargeable and dischargeable battery and a protection monitoring circuit for performing operations in relation to charging and discharging of said battery, said protection monitoring circuit comprising:
- a protection circuit portion having:
  - a detection circuit for detecting an overcurrent and/or an overcharge and an overdischarge; and
  - a protection circuit portion for protecting said battery from an overcurrent and/or an overcharge and an overdischarge,
- wherein said protection circuit portion comprises:
  - a first overcharge detecting portion for detecting an overcharge by using a first overcharge detecting threshold value; and
  - a second overcharge detecting portion for detecting an overcharge by using a second overcharge detecting threshold value.

10. The battery pack according to claim 9, wherein said second overcharge detecting portion is enabled when said first overcharge detecting portion detects an overcharge.

11. The battery pack according to claim 9, wherein said first overcharge detecting portion and said overcharge detecting portion detect an overcharge independent of each other.

12. A battery pack having a chargeable and dischargeable battery and a protection monitoring circuit for performing operations in relation to charging and discharging of said battery, said protection monitoring circuit comprising:
- a protection circuit portion having:
  - a detection circuit for detecting an overcurrent and/or an overcharge and an overdischarge; and
  - a protection circuit portion for protecting said battery from an overcurrent and/or an overcharge and an overdischarge,
- wherein said protection circuit portion comprises:
  - a first overcharge detecting portion for detecting an overcharge by using a first overcharge detecting threshold value;
  - a second overcharge detecting portion for detecting an overcharge by using a second overcharge detecting threshold value; and
  - a charging inhibition control portion adapted so that when said first overcharge detecting portion detects an overcharge, a switch provided on a charging path is turned off to thereby forcefully stop charging of said battery, and that when said second overcharge detecting portion detects an overcharge, a fuse provided on a charging path is blown to thereby forcefully stop charging of said battery.

13. A battery pack having a chargeable and dischargeable battery and a protection monitoring circuit for performing operations in relation to charging and discharging of said battery, said protection monitoring circuit comprising:
- a protection circuit portion having:
  - a detection circuit for detecting an overcurrent and/or an overcharge and an overdischarge; and
  - a protection circuit portion for protecting said battery from an overcurrent and/or an overcharge and an overdischarge,
- wherein said protection circuit portion comprises:
  - a first overdischarge detecting portion for detecting an overdischarge by using a first overdischarge detecting threshold value; and
  - a second overdischarge detecting portion for detecting an overdischarge by using a second overdischarge detecting threshold value.

14. The battery pack according to claim 13, wherein said second overdischarge detecting portion is enabled when said first overdischarge detecting portion detects an overdischarge.

15. The battery pack according to claim 13, wherein said first overdischarge detecting portion and said second overdischarge detecting portion detect an overdischarge independent of each other.

16. The battery pack according to claim 13, wherein said first or second overdischarge detecting portion detects an overdischarge by comparing a voltage of said battery pack with a predetermined voltage.

17. A battery pack having a chargeable and dischargeable battery and a protection monitoring circuit for performing operations in relation to charging and discharging of said battery, said protection monitoring circuit comprising:
    a protection circuit portion having:
        a detection circuit for detecting an overcurrent and/or an overcharge and an overdischarge; and
        a protection circuit portion for protecting said battery from an overcurrent and/or an overcharge and an overdischarge,
    wherein said protection circuit portion comprises:
        a first overdischarge detecting portion for detecting an overdischarge by using a first overdischarge detecting threshold value;
        a second overdischarge detecting portion for detecting an overdischarge by using a second overdischarge detecting threshold value; and
        a discharging inhibition control portion adapted so that when said first overdischarge detecting portion detects an overdischarge, an alarm representing a discharged state is sent to said management circuit portion to thereby forcefully stop discharging of said battery, and that when said second overdischarge detecting portion detects an overdischarge, a switch provided on a discharging path is turned off to thereby forcefully stop discharging of said battery.

18. A battery pack having a chargeable and dischargeable battery and a protection monitoring circuit for performing operations in relation to charging and discharging of said battery, said protection monitoring circuit comprising:
    a protection circuit portion having:
        a detection circuit for detecting an overcurrent and/or an overcharge and an overdischarge; and
        a protection circuit portion for protecting said battery from an overcurrent and/or an overcharge and an overdischarge,
    wherein said protection circuit portion turns off a power supply for said protection monitoring circuit or disables an operation of said protection monitoring circuit in when a switch provided on a discharging path is turned off at a time at which an overdischarge is detected.

19. A battery pack having a chargeable and dischargeable battery and a protection monitoring circuit for performing operations in relation to charging and discharging of said battery, said protection monitoring circuit comprising:
    a protection circuit portion having:
        a detection circuit for detecting an overcurrent and/or an overcharge and an overdischarge; and
        a protection circuit portion for protecting said battery from an overcurrent and/or an overcharge and an overdischarge,
    wherein said protection circuit portion comprises:
        a first overcurrent detecting portion for detecting an overcurrent by using a first overcurrent detecting threshold value; and
        a second overcurrent detecting portion for detecting an overcurrent by using a second overcurrent detecting threshold value.

20. The battery pack according to claim 19, wherein the first overcurrent detecting threshold value is larger than the second overcurrent detecting threshold value, and
    wherein a dead time corresponding to said first overcurrent detecting portion is shorter than a dead time corresponding to said first overcurrent detecting portion.

21. The battery pack according to claim 19, wherein said first overcurrent detecting portion and said second overcurrent detecting portion detect an overdischarge independent of each other.

22. A battery pack having a chargeable and dischargeable battery and a protection monitoring circuit for performing operations in relation to charging and discharging of said battery, said protection monitoring circuit comprising:
    a protection circuit portion having:
        a detection circuit for detecting an overcurrent and/or an overcharge and an overdischarge; and
        a protection circuit portion for protecting said battery from an overcurrent and/or an overcharge and an overdischarge,
    wherein said protection circuit portion has an overcurrent monitoring portion for detecting which of a charging direction and a discharging direction a direction of flow of a pack current is, and for detecting a magnitude of a monitor output voltage as a value, which is proportional to an absolute value of the pack current, regardless of the direction of flow of the pack current.

23. An electronic apparatus comprising:
    a battery pack including a chargeable and dischargeable battery and a protection monitoring circuit for performing operations in relation to charging and discharging of said battery, said battery pack comprising:
        an input terminal from which a power supply activating signal is inputted from an external circuit; and
        a pack power supply control portion for connecting electric power from said battery to said protection monitoring circuit when the power supply activating signal is inputted to said input terminal, and for interrupting supply of electric power to said protection monitoring circuit when no power supply activating circuit signal is inputted to said input terminal; and
    a switch for supplying a power supply activating signal to said input terminal.

* * * * *